(12) United States Patent
Hashi et al.

(10) Patent No.: US 6,909,565 B2
(45) Date of Patent: Jun. 21, 2005

(54) MAGNETIC TRANSFER METHOD AND MAGNETIC TRANSFER APPARATUS

(75) Inventors: Hideyuki Hashi, Kadoma (JP); Taizou Hamada, Katano (JP); Tatsuaki Ishida, Otsu (JP); Kiyokazu Tohma, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 27 days.

(21) Appl. No.: 10/718,136

(22) Filed: Nov. 20, 2003

(65) Prior Publication Data

US 2004/0100710 A1 May 27, 2004

Related U.S. Application Data

(63) Continuation of application No. 10/203,328, filed as application No. PCT/JP01/02607 on Mar. 28, 2001.

(30) Foreign Application Priority Data

Mar. 31, 2000 (JP) .......................................... 2000-97308
Apr. 26, 2000 (JP) ........................................ 2000-125744

(51) Int. Cl.[7] ................................................. G11B 5/86
(52) U.S. Cl. .............................. 360/17; 360/15; 360/16
(58) Field of Search ............................... 360/15–17, 75, 360/31, 133; 429/694 R, 694 SG; 451/302–303; 428/692, 694 T; 29/603.16, 603.15

(56) References Cited

U.S. PATENT DOCUMENTS 5,012,618 A 5/1991 Price et al. ................. 451/302

6,665,133 B1 12/2003 Hashi et al. .................. 360/17
6,724,549 B2 4/2004 Mine ............................ 360/17
6,731,446 B2 * 5/2004 Ikeda et al. ................... 360/59

FOREIGN PATENT DOCUMENTS

| EP | 0 915 456 | 5/1999 |
|---|---|---|
| JP | 3-276049 | 12/1991 |
| JP | 9-63051 | 3/1997 |
| JP | 10-40544 | 2/1998 |
| JP | 10-293923 | 11/1998 |
| JP | 11-25455 | 1/1999 |
| WO | WO00/65579 | 11/2000 |
| WO | WO00/65580 | 11/2000 |

* cited by examiner

*Primary Examiner*—Sinh Tran
*Assistant Examiner*—Natalia Figueroa
(74) *Attorney, Agent, or Firm*—Merchant & Gould P.C.

(57) ABSTRACT

A magnetic transfer method includes a first step (ST103) of preparing a magnetic disk, a second step (ST105) of forming a layer of lubricant on the magnetic disk, a third step (ST108) of bringing a surface of the magnetic layer on the magnetic disk into close contact with a magnetic transfer master having a magnetic film formed on at least one side and magnetically transferring a pattern of the magnetic film on the magnetic transfer master onto the surface of the magnetic disk through application of an external magnetic field, and a fourth step (ST104, ST106) of burnishing at least a surface of the magnetic disk that comes into contact with the magnetic transfer master. The first step, the fourth step, the second step, the fourth step, and the third step are performed in the stated order.

13 Claims, 14 Drawing Sheets

| Method | | | | | | | | | | | | | Evaluation results | |
|---|---|---|---|---|---|---|---|---|---|---|---|---|---|---|
| | | | | | | | | | | | | | No. of Defects | D.O |
| 1 | Sputtering | Tape burnishing | Application of lubricant | Head burnishing | Glide height test | Read/write test | | | Magnetic transfer | | Tape burnishing | Glide height test | Optical investigation | 1.3 | B |
| 2 | Sputtering | Tape burnishing | Application of lubricant | Head burnishing | Glide height test | Read/write test | | | Magnetic transfer | | | Glide height test | Optical investigation | 6 | B |
| 3 | Sputtering | Tape burnishing | Application of lubricant | Head burnishing | Glide height test | Read/write test | Tape burnishing | | Magnetic transfer | | | Glide height test | Optical investigation | 7.7 | B |
| 4 | Sputtering | Tape burnishing | Application of lubricant | | | | | | Magnetic transfer | | Tape burnishing | Glide height test | Optical investigation | 1.3 | B |
| 5 | Sputtering | Tape burnishing | | | | | | | Magnetic transfer | Application of lubricant | Tape burnishing | Glide height test | Optical investigation | 1.5 | B |
| 6 | Sputtering | Tape burnishing | Application of lubricant | Head burnishing | Glide height test | Read/write test | | Optical investigation | Magnetic transfer | | Tape burnishing | Glide height test | Optical investigation | 1 | A |
| 7 | Sputtering | Tape burnishing | Application of lubricant | Head burnishing | | | | Optical investigation | Magnetic transfer | | Tape burnishing | Glide height test | Optical investigation | 1 | A |
| 8 | Sputtering | Tape burnishing | Application of lubricant | Head burnishing | | | | Optical investigation | Magnetic transfer | | | Glide height test | Optical investigation | 1 | A |

FIG. 13

MAGNETIC TRANSFER METHOD AND MAGNETIC TRANSFER APPARATUS

"This application is a continuation of application Ser. No. 10/203,328, filed Aug. 6, 2002, which is a National Stage Application of PCT/JP01/02607, filed Mar. 28, 2001, which application(s) are incorporated herein by reference."

TECHNICAL FIELD

The present invention relates to a method for magnetically transferring a signal onto magnetic disks such as those used in hard disk drives and floppy disk drives, and to an apparatus that uses this method.

BACKGROUND ART

In the field of magnetic recording/reproduction apparatuses, there is a trend towards the use of higher recording densities with the aim of producing small, high-capacity apparatuses. A representative example of a magnetic recording/reproduction apparatus is a hard disk drive. Hard disk drives with areal recording densities in excess of 10 GBit/in$^2$ already have appeared on the market, with 20 Gbit/in$^2$ drives being expected in the next few years due to the rapid technological advancements being made in this field.

A major factor in the achievement of high recording densities is the use of magneto-resistive type heads that allow increases in linear recording density and can reproduce, with a favorable S/N ratio, a signal recorded on a track no wider than a few microns.

The increases in recording density also have made it necessary to reduce the distance that a floating magnetic slider floats above the surface of a magnetic disk. This increases the probability of the slider colliding with the disk due to a variety of causes. Such a situation requires that magnetic disks be made with smoother surfaces.

Tracking servo technology used in a head also plays an important role in having a head precisely follow a narrow track. Modern hard disk drives that use such tracking servo technology have areas in which tracking servo signals, address information signals, reproduction dock signals and the like are recorded that are provided on magnetic recording media at intervals of a predetermined angle, (also called "preformat recording areas" in the following). A drive apparatus detects the position of the head from the above signals that are outputted by the head at predetermined time intervals, and corrects the head position so that the head can properly follow a track on the disk.

The servo signals, address information signals and reproduction dock signals therefore are used as reference signals in order to have the head properly scan tracks on the disk. As a result, high positional accuracy is required when writing these signals onto a disk (such writing is hereafter referred to as "formatting" the disk). For current hard disk drives, the recording head is positioned during formatting using a dedicated servo apparatus equipped with a highly precise position detecting apparatus that uses optical interference (hereafter such servo apparatuses are referred to as "servo writers").

However, formatting using an aforementioned servo writer has the following drawbacks.

Firstly, recording by a magnetic head is linear recording where there is relative movement between the magnetic head and the magnetic recording medium. Since it is necessary to record signals on a large number of tracks, preformatting using a servo writer takes a long time. To make manufacturing more efficient, several expensive, dedicated servo writers need to be provided, making the preformatting operation very costly.

Secondly, the implementation and maintenance of many servo writers incurs a high cost. This cost becomes more severe as the track density and number of tracks increase.

As a result, a different formatting method that does not use servo writers has been proposed. With this method, a disk called a "master" on which all of the servo information is recorded is placed on top of the magnetic disk to be formatted and energy to achieve transfer is applied from an external source to transfer all of the master information onto the magnetic disk.

One example of this technique is the magnetic recording apparatus taught by Publication of Unexamined Japanese Patent Application JP H10-40544A. According to this application, a magnetic portion made from a ferromagnetic material is formed in a pattern corresponding to an information signal on a substrate surface, thereby producing a master information carrier. The surface of this master information carrier is brought into contact with the surface of a magnetic recording medium. This magnetic recording medium may be in the form of a sheet or a disk, and is provided with a ferromagnetic thin film or an applied layer of a ferromagnetic powder. A predetermined magnetic field is then applied, so that a magnetic pattern corresponding to the information signals formed on the master information carrier is recorded on the magnetic recording medium.

With the above method, the arrangement of patterns corresponding to the information signals on the master information carrier can be recorded simultaneously onto the magnetic recording medium as magnetic patterns. When recording information signals using this kind of magnetic transfer apparatus, it is important to have the information signals recorded uniformly and with high stability across the entire surface of the magnetic recording medium. However, when unwanted protrusions or foreign matter are present at the interface of the magnetic recording medium and the master information carrier, depressions appear in the surface of the magnetic recording medium when the magnetic recording medium comes into contact with the master information carrier.

FIG. 18 shows a graph produced by measuring a cross-section of a depression appearing after the magnetic recording medium and master information carrier have been brought into contact and magnetic transfer has been carried out with a conventional magnetic transfer method. As shown in FIG. 18, the depression is about 50 nm deeper than the surface of the magnetic recording medium, and is surrounded by a slight protrusion that is about 20 nm high.

A floating magnetic slider generally floats about 20 nm above the surface of a magnetic recording medium. If, like the medium shown in FIG. 18, a magnetic recording medium has protrusions that are 20 nm high, the magnetic head will come into contact with the magnetic recording medium during the recording and reproduction of data. When this happens, the impact forces the magnetic head upward, increasing the clearance between the magnetic head and the magnetic recording medium and worsening the signal recording/reproduction performance. Also, physical contact between the magnetic head and the magnetic recording medium shortens the life of the magnetic head and can lead to disk failures for the magnetic recording medium.

FIG. 19 is a depiction of the measurements produced by optically measuring protrusions across the entire surface of a magnetic recording medium on which information has been magnetically transferred using a conventional magnetic transfer method. As can be seen, a large number of protrusions 20 nm or higher are present on the surface of the magnetic recording medium.

As described above, magnetic transfer according to conventional magnetic transfer methods often results in a large number of protrusions being present on the magnetic disk after the magnetic transfer. This causes the problems of lower recording/reproduction performance of the magnetic recording medium and a shorter lifespan for a magnetic head. If the moves towards higher recording densities are accompanied by a reduction in the distance that a magnetic head floats above a magnetic recording medium, these problems will become more severe.

DISCLOSURE OF INVENTION

It is an object of the present invention to provide a highly reliable magnetic transfer method that solves the above problems that occur with conventional methods, and that suppresses the occurrence of minute protrusions on a magnetic disk.

The magnetic transfer method of the present invention includes a first step of preparing a magnetic disk; a second step of forming a layer of lubricant on the magnetic disk; a third step of bringing the magnetic disk into close contact with a magnetic transfer master having a magnetic film formed on at least one side and magnetically transferring a pattern of the magnetic film on the magnetic transfer master onto the magnetic disk through application of an external magnetic field; and a fourth step of burnishing at least a surface of the magnetic disk that comes into contact with the magnetic transfer master. The first step, the fourth step, the second step, the fourth step, and the third step are performed in the stated order.

With this method, a burnishing process is performed on the surface of a magnetic disk before magnetic transfer, so that unwanted protrusions and foreign matter are removed from the surface of the magnetic disk, thereby making highly reliable magnetic transfer possible.

Another magnetic transfer method of the present invention includes a step of bringing a magnetic disk into close contact with a magnetic transfer master having a magnetic film formed on at least one side; a step of magnetically transferring a pattern of the magnetic film on the magnetic transfer master onto the magnetic disk through application of an external magnetic field; and a step of optically detecting defects in the surface of the magnetic disk. The magnetic transfer step is performed immediately after confirming in the optically detecting step that one of a number of defects on the surface of the magnetic disk and a size of the defects on the surface of the magnetic disk is not greater than a predetermined value.

With the above method, the magnetic transfer is performed immediately after confirming that there are no defects on the surface of the magnetic disk. This makes it is possible to perform highly reliable magnetic transfer where defects are not produced in the surface of the magnetic disk.

Yet another magnetic transfer method of the present invention includes a steps of bringing a magnetic disk into close contact with a magnetic transfer master having a magnetic film formed on at least one side; a step of magnetically transferring a pattern of the magnetic film on the magnetic transfer master onto the magnetic disk through application of an external magnetic field; and a step of detecting defects in the magnetic disk by scanning the magnetic disk with a detection head that floats a predetermined distance above the surface of the magnetic disk. The detecting step is performed after the magnetic transfer step.

The above method provides a highly reliable magnetic transfer method where defects are not produced in the surface of a magnetic disk due to magnetic transfer, and can supply magnetic disks that have no surface defects.

Other magnetic transfer methods in the following all include a defect detecting step for detecting defects in a disk, in addition to a basic magnetic transfer process of bringing a magnetic disk into close contact with a magnetic transfer master having a magnetic film formed on at least one side, and magnetically transferring a pattern of the magnetic film on the magnetic transfer master onto the magnetic disk through application of an external magnetic field.

In one of these other magnetic transfer methods, after the defect detecting step has confirmed that one of a number of defects on the surface of a cleaning disk and a size of the defects on the surface of the cleaning disk is not greater than a predetermined value, the cleaning disk is brought into close contact and separated from the magnetic transfer master a predetermined number of times, before the magnetic transfer master is brought into dose contact with the magnetic disk and magnetic transfer is performed.

With the stated method, foreign matter that adheres to the magnetic transfer master can be quickly and reliably removed, thereby making the magnetic transfer method highly reliable.

In another of these other magnetic transfer methods, after a cleaning disk is brought into dose contact and separated from the magnetic transfer master a predetermined number of times, the magnetic transfer master is brought into dose contact with a detection disk, the detection disk having been subjected to the defect detecting step to confirm, for a surface of the detection disk that comes into contact with the magnetic transfer master, that one of a number of defects and a size of the defects is not greater than a predetermined value, and the detection disk is then subjected to the defect detecting step and when the defect detecting step confirms that one of a number of defects on a surface and a size of the defects is not greater than a predetermined value, the magnetic disk and the magnetic transfer master are brought into dose contact and magnetic transfer is performed.

Thus, the detection of defects on the magnetic transfer master can be performed easily and with very high precision, thereby making the magnetic transfer method highly reliable.

In yet another of these other magnetic transfer methods, the magnetic transfer master is brought into dose contact and separated from a cleaning disk a predetermined number of times, the cleaning disk having been subjected to the defect detecting step to confirm, for a surface of the cleaning disk that comes into contact with the, magnetic transfer master, that one of a number of defects and a size of the defects is not greater than a predetermined value. The magnetic transfer master is then brought into close contact with a detection disk, the detection disk having been subjected to the defect detecting step to confirm, for a surface of the detection disk that comes into contact with the magnetic transfer master, that one of a number of defects and a size of the defects is not greater than a predetermined value, and the detection disk is then subjected to the defect detecting step and when the defect detecting step confirms that that one of a number of defects on a surface and a size of the defects is not greater than a predetermined value, the magnetic disk and the magnetic transfer master are brought into dose contact and magnetic transfer is performed.

In yet another of these other magnetic transfer methods, after the pattern of the magnetic film on the magnetic transfer master has been magnetically transferred onto the magnetic disk, the magnetic disk is subjected to the defect detecting step, and when one of the number of defects and size of defects is equal or greater than a predetermined value, the magnetic transfer master is brought into close contact with and separated from a cleaning disk a predetermined number of times.

Thus, foreign matter that adheres to the magnetic transfer master can be detected quickly and easily, before being removed. As a result, magnetic transfer can be performed with highly reliability.

BRIEF DESCRIPTION OF THE DRAWINGS

FIG. 13 shows experimental results obtained by investigating defects on a magnetic disk and signal errors for various magnetic disk conditioning methods.

BEST MODE FOR CARRYING OUT THE INVENTION

The following describes the preferred embodiments of the present invention with reference to the accompanying drawings.

First Embodiment

The following describes a magnetic transfer method and magnetic transfer apparatus according to the first embodiment of the present invention, with reference to FIGS. 1 to 11.

Figure 1:
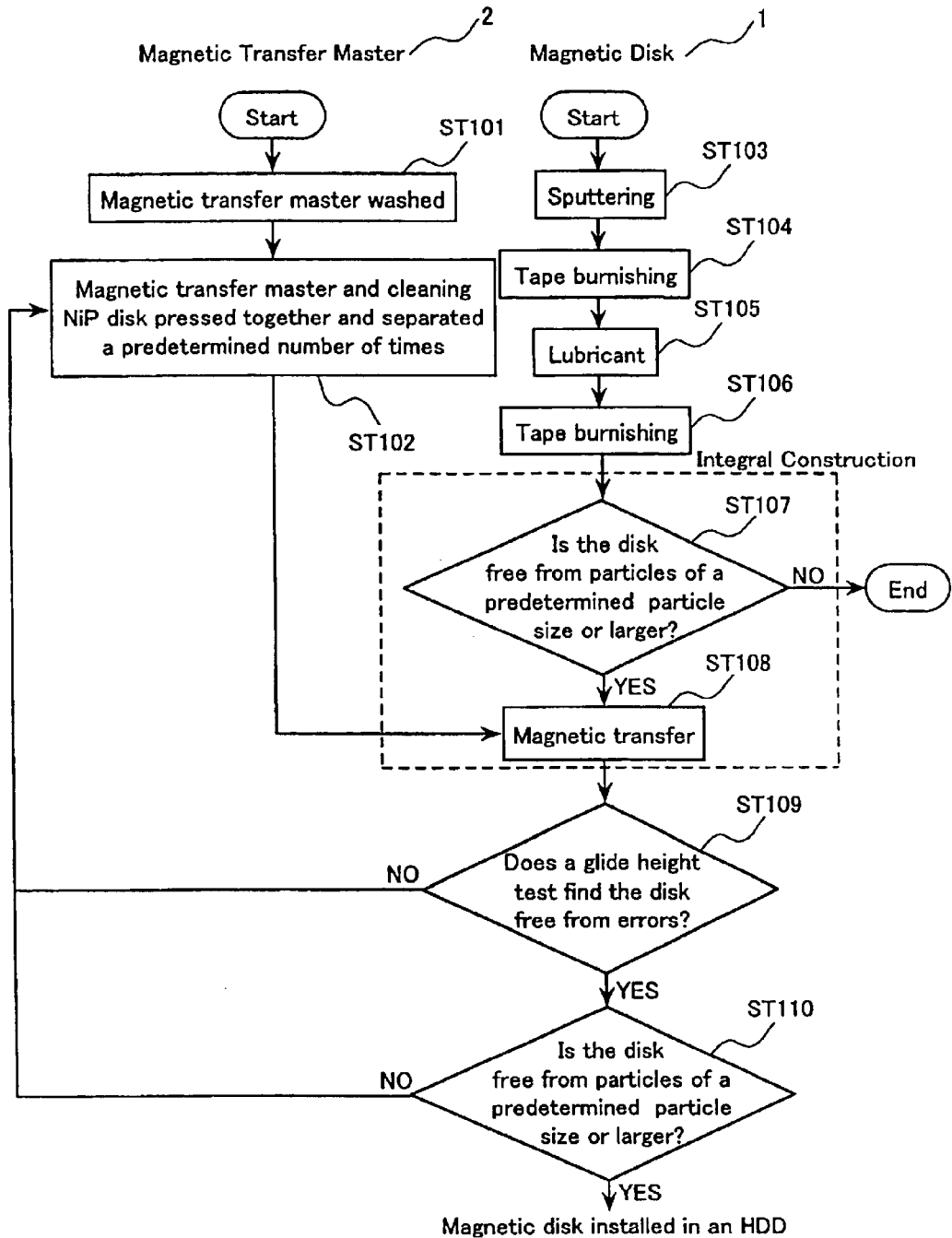
FIG. 1 is a flowchart showing the various processes performed in the magnetic transfer method of the first embodiment of the present invention.

FIG. 1 shows the flow of a process for magnetic transfer, including a process for manufacturing and conditioning the magnetic disk. First, a master disk used for the magnetic transfer is described.

Figure 2:
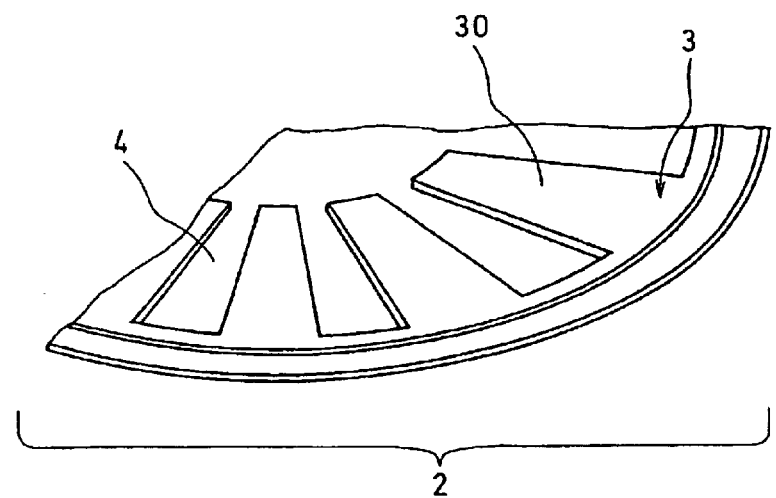
FIG. 2 shows a magnification of part of the magnetic transfer master used in the present method.

FIG. 2 is an enlarged view of part of a magnetic transfer master disk 2 showing the disk configuration. In FIG. 2, numeral 30 indicates a magnetic film that enables a magnetic pattern to be transferred onto a magnetic disk. A master information pattern is formed on this magnetic film 30, in a pattern corresponding to the digital information signal to be recorded on the magnetic disk. This master information pattern is formed in a magnetic portion made up of a ferromagnetic thin film. Radial grooves 4 are also provided on the same contact surface 3 as the magnetic film 30.

Various types of magnetic materials can be used for the ferromagnetic thin film, such as hard magnetic materials, semihard magnetic materials, or soft magnetic materials. Any material that enables a digital information signal to be recorded on the magnetic recording medium may be used. As examples, iron, cobalt, or an alloy of iron and cobalt may be used.

In order to produce a sufficient magnetic field for transferring the master information regardless of the magnetic disk type, the saturation magnetic flux density of the magnetic material should be as high as possible. In particular, for magnetic disks that have a high coercivity in excess of 2000 oersted, or large flexible disks with a thick recording layer, there are cases where a saturation magnetic flux density of 0.8 tesla or below is not sufficient for recording to be performed properly. For this reason, a magnetic material with a saturation magnetic flux density of 0.8 tesla or above, or preferably 1.0 tesla or above, is used.

As shown in step ST101 in FIG. 1, the magnetic transfer master 2 of the above configuration is washed using a conventional method, such as scrubbing. However, it has been found by experimentation that using a conventional washing, it is not possible to remove minute unwanted protrusions in the magnetic film 30 that remain in the contact surface 3 of the magnetic transfer master 2 or minute particles of foreign matter whose sizes range from about 20 to 50 nm. For this reason, step ST102 is performed to completely remove such minute particles of foreign matter. In step ST102, the magnetic transfer master disk and a cleaning NiP disk are pressed closely together and separated a predetermined number of times. This step ST102 is described below with reference to FIGS. 3 and 4.

Figure 3:
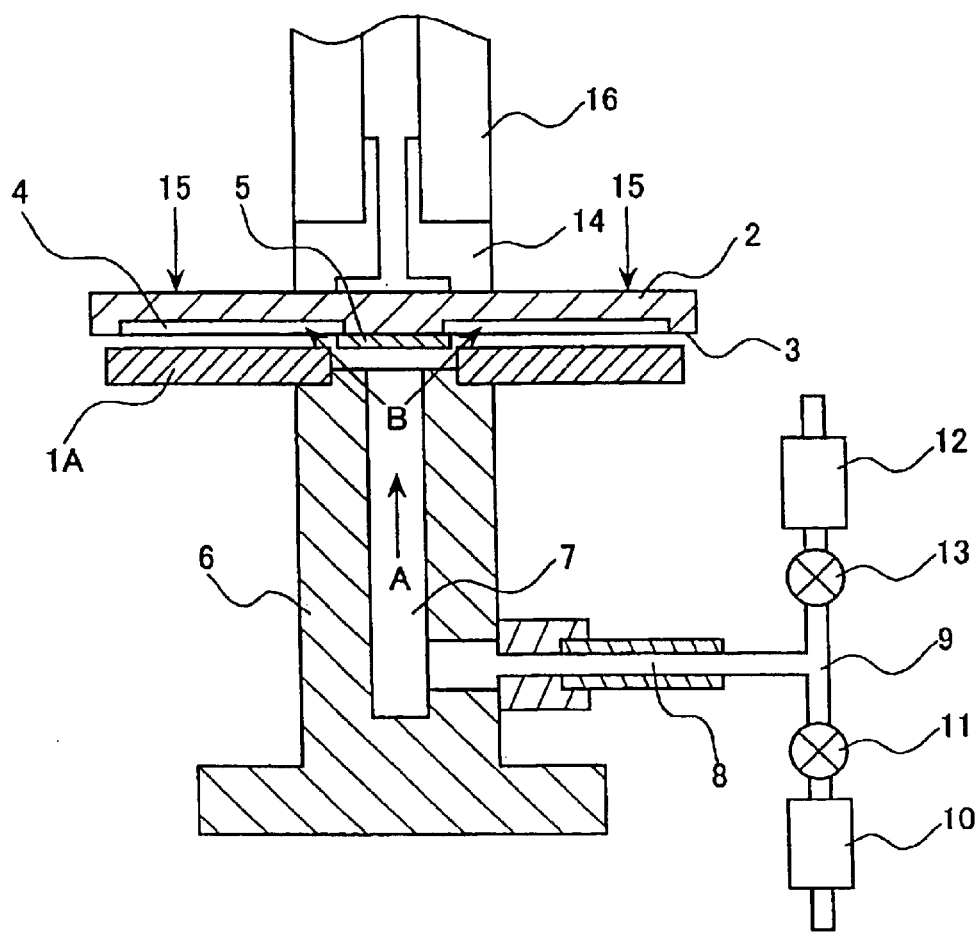
FIG. 3 is a cross-sectional drawing showing an apparatus used in step ST102 of the present method during a separating operation.
Figure 4:
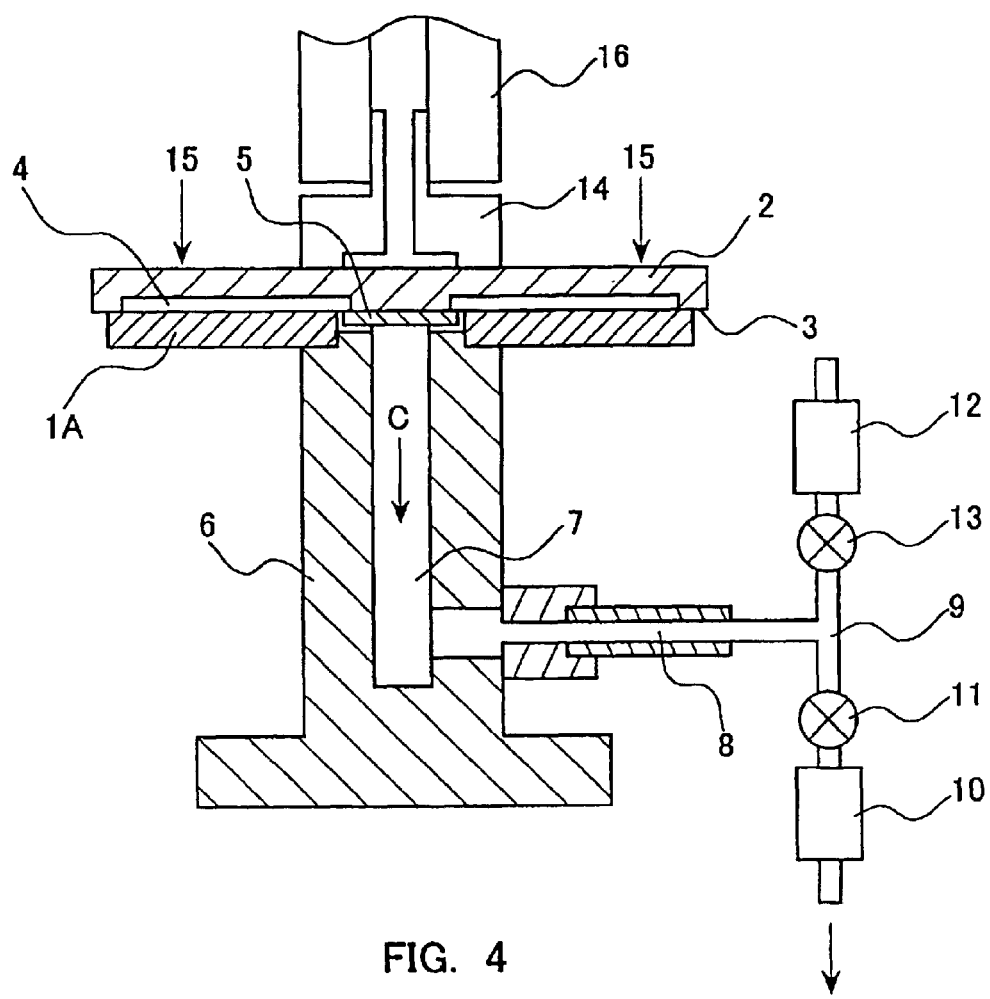
FIG. 4 shows the apparatus of FIG. 3 during a pressing operation.

FIGS. 3 and 4 are cross-sectional drawings showing the apparatus that performs step ST102 and the operation of this apparatus. FIG. 3 shows the apparatus during the separation operation, while FIG. 4 shows the apparatus during the pressing operation. In these drawings, numeral 1A indicates the cleaning NiP disk, while numeral 2 indicates the magnetic transfer master disk that is pressed against the surface of the cleaning NiP disk 1A.

Numeral 3 indicates the surface of the magnetic transfer master 2 that comes into contact with the cleaning NiP disk 1A. Grooves 4 are provided in this contact surface 3. FIG.

Figure 5:
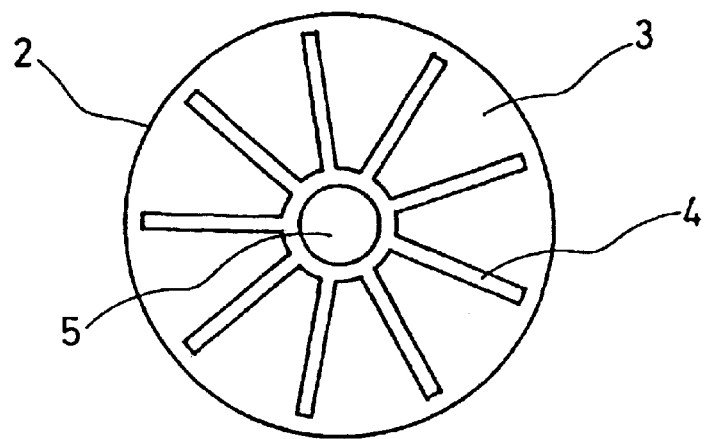
FIG. 5 is a top view of the magnetic transfer master used in the first embodiment.
Figure 6:
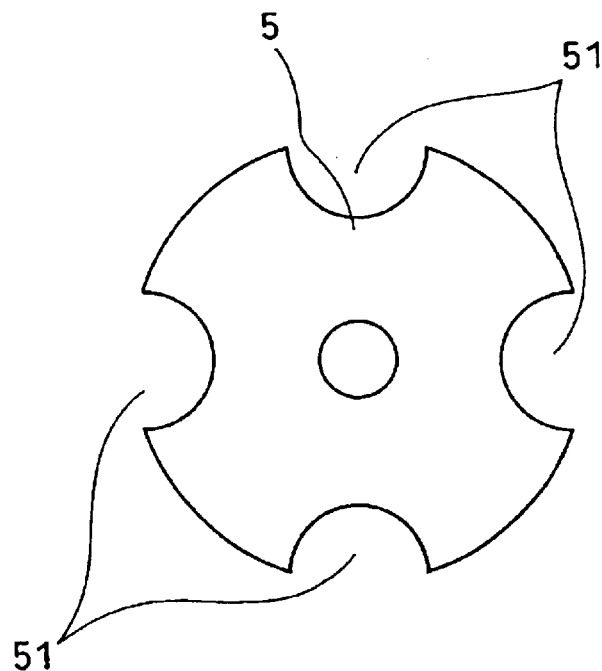
FIG. 6 is a top view of the boss used in the apparatus shown in FIG. 3 and in FIG. 4.

5 is a top view of the contact surface 3. As shown in FIG. 5, the grooves 4 extend radially from the center of the magnetic transfer master 2. In the present embodiment, the grooves 4 are about five microns deep. Numeral 5 indicates a boss that is fixed to the center of the magnetic transfer master 2. The boss 5 engages a center hole of the cleaning NiP disk 1A, and so centers the magnetic transfer master 2 and the cleaning NiP disk 1A. Also, as shown in FIG. 6, predetermined gaps 51 are provided between the center hole of the cleaning NiP disk 1A and the boss 5, thereby allowing air to pass between them.

In FIGS. 3 and 4, numeral 6 indicates a support for supporting the cleaning NiP disk 1A. A through hole 7 is provided in the center of the support 6 to allow the passage of air. Numeral 8 indicates an air duct that expels air from between the magnetic transfer master 2 and the cleaning NiP disk 1A or pumps air between the two disks. Numeral 9 indicates an exhaust outlet for allowing the air expelled by the air duct 8 to escape, numeral 10 indicates a suction pump that is connected to the exhaust outlet 9, and numeral 11 indicates an exhaust valve that controls the expulsion of air. Numeral 12 indicates an air supplying pump for pumping air into the air duct 8, while numeral 13 indicates an air supplying valve for controlling the supplying of air. The air supplying pump 12 is provided with a 0.01 micron air filter, so that particles of foreign matter that are 0.01 microns or larger in size are not pumped into the air duct 8. Numeral 14 indicates a holding arm that holds the magnetic transfer master 2. This holding arm 14 is fixed to the magnetic transfer master 2. A boss formed at the top of the holding arm 14 is supported by a guide member 16 so as to position the holding arm 14 with the holding arm 14 free to slide in the vertical direction.

The following describes the separation and pressing operations in detail, with reference to FIGS. 3 and 4.

First, the separation of the disks through the supplying of air is described with reference to FIG. 3. During this operation, the air supplying pump 12 is operated with the exhaust valve 11 closed and the air supplying valve 13 open, so that air flows into the air duct 8. As a result, air is pumped through the through hole 7 upward, which is to say, in the direction shown by the arrow A in FIG. 3. The air that is pumped through the through hole 7 presses the boss 5 upward. Air is also pumped into the grooves 4, as shown by the arrows B. This air that is pumped into the grooves 4 spreads out radially from the center of the magnetic transfer master 2 via the grooves 4. The air then passes through the gap between the magnetic transfer master 2 and the cleaning NiP disk 1A and escapes to the atmosphere. This flow of air carries any fine particles of foreign matter that adhere to the surface of the magnetic transfer master 2 or the cleaning NiP disk 1A out of the apparatus.

Figure 7:
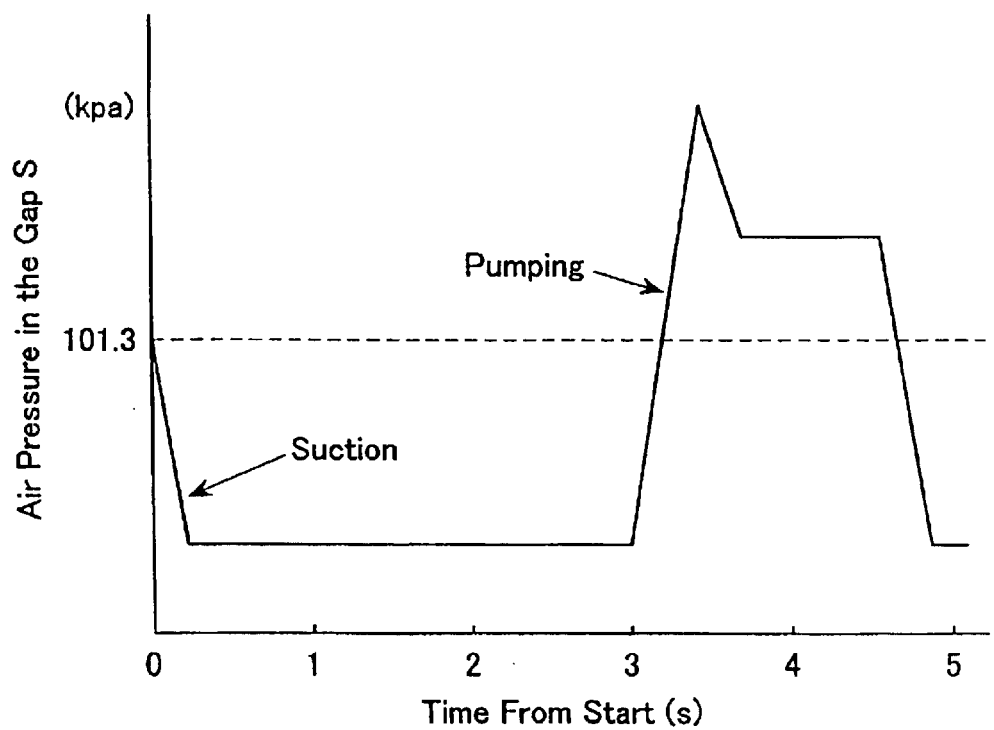
FIG. 7 shows the relationship between the passage of time and air pressure in a gap S formed by the apparatus shown in FIG. 3 and in FIG. 4.

FIG. 7 shows the relationship between the passage of time and the air pressure of the air in the gap (hereafter referred to as "gap S") between the magnetic transfer master 2 and the cleaning NiP disk 1A. As shown in FIG. 7, separation of the disks through the pumping of air begins after three seconds. As a result, the air pressure of the air in the gap S sharply increases from a pressure of 101.3 kPa. After about one second, a pressure of about 130 kPa is maintained. This period corresponds to the separation of the magnetic transfer master 2 and the cleaning NiP disk 1A.

During this operation, it is preferable for the gap between the cleaning NiP disk 1A and the magnetic transfer master 2 to be set as narrow as possible. In the present embodiment, the gap is set at about 0.5 mm. This increases the speed at which air flows between the cleaning NiP disk 1A and the magnetic transfer master 2, ensuring that fine particles of foreign matter present between the two disks are carried out of the apparatus.

In the present embodiment, the distance between the cleaning NiP disk 1A and the magnetic transfer master 2 is controlled by having the upper surface of the holding arm 14 touch the lower surface of the guide member 16 just when the magnetic transfer master 2 and the holding arm 14 have risen by 0.5 mm from the positions they hold when the cleaning NiP disk 1A and magnetic transfer master 2 are pressed together.

Next, the pressing together of the disks through the evacuation of air is described with reference to FIG. 4. During this operation, the air supplying pump 12 is stopped and the air supplying valve 13 is closed. As a result, the holding arm 14 to which the magnetic transfer master 2 is attached falls under its own weight, and the boss 5 engages the center hole of the cleaning NiP disk 1A, thereby mounting the cleaning NiP disk 1A. After this, the exhaust valve 11 is opened and the suction pump 10 is operated.

Due to the above operations, air flows through the through hole 7 downwards, in the direction shown by the arrow C in FIG. 4. The air in the grooves 4, which is to say the air in the gap S, also flows through the gap between the center hole of the cleaning NiP disk 1A and the boss 5, resulting in the air pressure in the grooves 4 that are covered by the cleaning NiP disk 1A falling below atmospheric pressure. Therefore the cleaning NiP disk 1A is pressed onto the magnetic transfer master 2 mainly by atmospheric pressure 15.

As a result, foreign matter present on the cleaning NiP disk 1A is sandwiched between the cleaning NiP disk 1A and the magnetic transfer master 2. Since the cleaning NiP disk 1A is manufactured using a softer material than the magnetic transfer master 2, foreign matter that is sandwiched between the two disks sinks into the cleaning NiP disk 1A or causes depressions in the cleaning NiP disk 1A, without damaging the surface of the magnetic transfer master 2. Unintended minute protrusions in the magnetic transfer master 2 are also flattened when the magnetic transfer master 2 is pressed against the cleaning NiP disk 1A. In FIG. 7, the period that follows the start of evacuation at zero seconds and during which the air pressure in the gap S is about 30 kPa corresponds to the time in which the disks are pressed together.

Following the pressing operation, the separating operation shown in FIG. 3 is repeated. That is to say, the exhaust valve 11 is closed, the air supplying valve 13 is opened, and the air supplying pump 12 is operated. This results in air being pumped in the directions shown by the arrows A and B in FIG. 3. The air pumped in this way forces the magnetic transfer master 2 upward until the upper surface of the holding arm 14 comes into contact with the lower surface of the guide member 16. At this point, air passes through the grooves 4 and continues to be pumped radially outwards from the center of the magnetic transfer master 2 to the outer periphery of the disk, as shown by the arrows B. As a result, foreign matter that is present on the surface of the magnetic transfer master 2 is expelled to the atmosphere together with the air pumped by the air supplying pump 12, or is transferred onto the cleaning NiP disk 1A. By repeating the pressing together and separating operations a predetermined number of times, foreign matter can be removed from the surface of the magnetic transfer master 2.

The following describes the method by which a magnetic disk 1 is manufactured and conditioned.

First, as shown by step ST103 (sputtering), a magnetic layer is formed on the surface of a substrate using a conventional method. As one example, this magnetic layer can be formed by subjecting an aluminum substrate to a dry plating method, such as vapor deposition or sputtering. Conventionally, this magnetic layer is protected by forming a protective layer on top of the magnetic layer using dip coating, spin coating, or a dry plating method, such as vapor deposition or sputtering.

Figure 8:
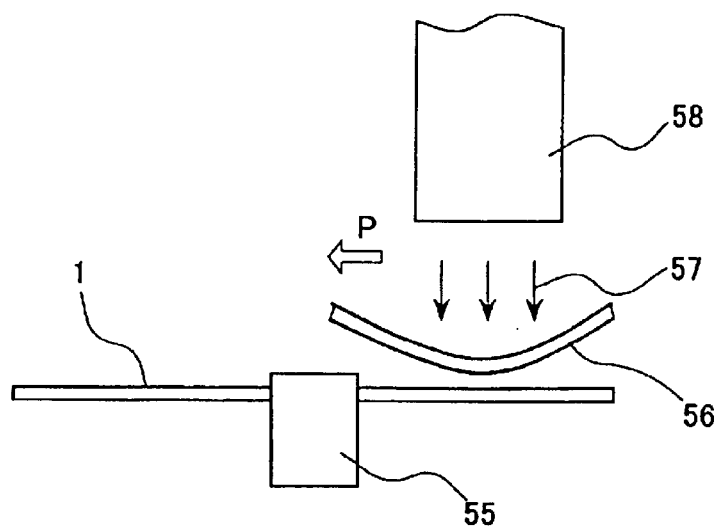
FIG. 8 shows a tape burnishing step ST104 included in the magnetic transfer method of the first embodiment.

Following step ST103, in step ST104 tape burnishing is performed. This process is described below with reference to FIG. 8. FIG. 8 shows how tape burnishing is performed in the present embodiment of the present invention. This process is performed using a spindle 55 for rotating the magnetic disk 1, lapping tape 56 for removing protrusions from the surface of the magnetic disk 1, and a nozzle 58 for supplying air 57 that presses the lapping tape 56 against the magnetic disk 1.

First, the magnetic disk 1 is rotated and air 57 is supplied by the nozzle 58 to press the lapping tape 56 against the magnetic disk 1. At the same time, the lapping tape 56 is moved in the direction shown by the arrow P in FIG. 8 and so removes protrusions from the surface of the magnetic disk 1. In this burnishing process, lapping tape 56 with an average granular surface roughness of 1.0 microns was used. The pressure applied by the lapping tape 56 onto the surface of the magnetic disk 1 was set at 400 kPa. If the pressure is too high, the surface of the magnetic disk 1 may be damaged. If the pressure is too low, the effect of burnishing is not sufficient. This process is able to remove unwanted protrusions that are present on the surface of the magnetic disk 1 following the formation of the protective layer.

The average granular surface roughness of the lapping tape 56 is preferably within the range from 0.1 microns to 5.0 microns. If the average granular surface roughness is below 0.1 microns, the burnishing may not be performed effectively. If the average granular surface roughness is above 5.0 microns, the surface of the magnetic disk 1 may be damaged. As an abrasive layer for forming the granular surface of the lapping tape 56, it is preferable to use a hard abrasive such as $\alpha$—$Al_2O_3$, $SiO_2$, diamond and so on. If the abrasive layer does not include a hard abrasive, the effect of burnishing is not sufficient.

A support member of the lapping tape 56 may be a film made of polyester resin such as polyethylene terephthalate (PET), polyolefin resin such as polypropylene, polycarbonate, polyamide and so on.

After step ST104, a conventional lubricant is applied, as shown by step ST105 in FIG. 1. In this step, lubricant is applied to the magnetic disk 1 by immersing the magnetic disk 1 in a lubricant solution and then pulling out the magnetic disk 1 at a predetermined speed.

Once step ST105 has been performed, tape burnishing is repeated in step ST106. The same procedure is used as in step ST104, though a different amount of pressure is applied. That is, in FIG. 8, 40 kPa is applied to press the lapping tape 56 against the magnetic disk 1.

As described above, tape burnishing is performed before and after the formation of the lubricant. During the latter tape burnishing process, the amount of pressure applied onto the magnetic disk 1 by the lapping tape 56 is reduced, thereby ensuring that foreign matter present on the surface of the magnetic disk 1 after the formation of the lubricant layer can be removed.

It has been found by experimentation that when a magnetic disk 1 is conditioned using the above steps, a magnetic disk 1 can be produced in a favorable state for subsequent magnetic transfer, with no foreign matter or unwanted protrusions present on the surface of the magnetic disk 1 before magnetic transfer is performed. This is described in detail later in this specification with reference to FIG. 13.

Figure 9:
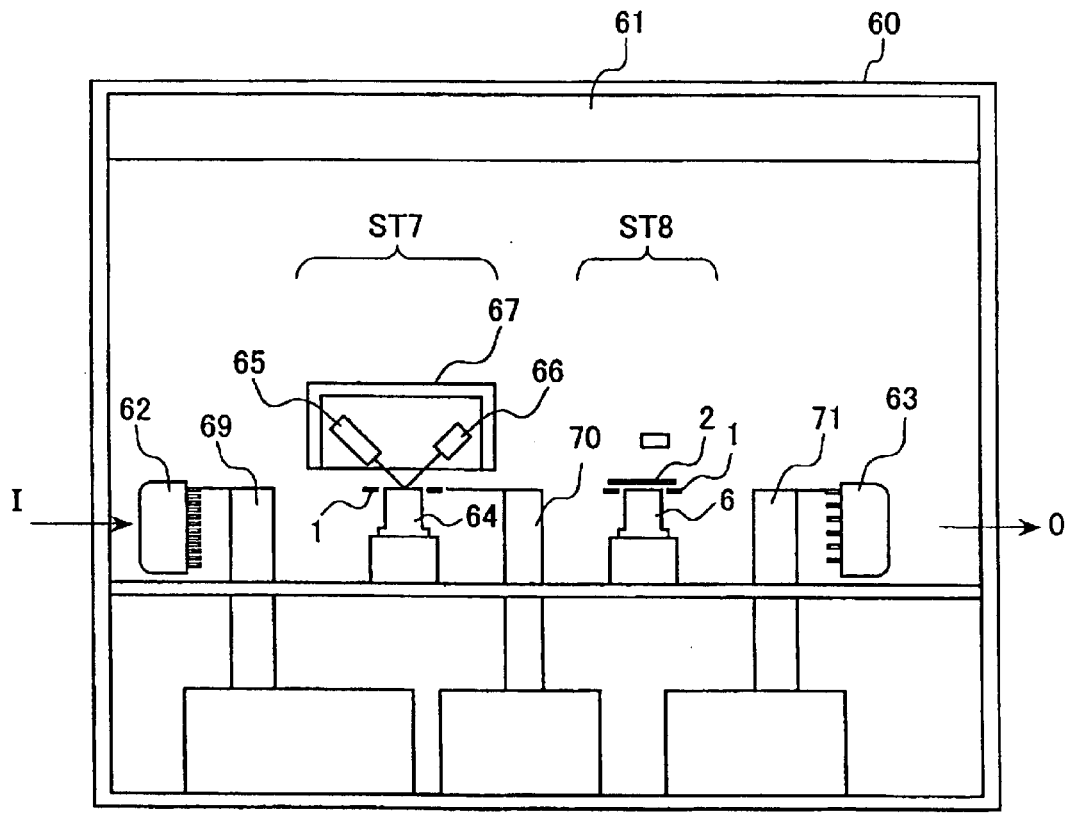
FIG. 9 is a simplified cross-sectional view of an apparatus that performs step ST107 and step ST108 of the present method.

The following describes steps ST107 and ST108 with reference to FIG. 9. In FIG. 9, numeral 60 indicates a clean booth. To stop particles of foreign matter from entering the clean booth 60, a filter 61 with a collection efficiency of 99.9999995% for particles of foreign matter that are 0.01 microns or larger in size is provided at the top of the clean booth 60. Apparatuses for performing step ST107, in which the presence of foreign matter on the surface of the magnetic disk 1 is investigated using an optical detection method, and step ST108, in which magnetic transfer is performed, are arranged in the dean booth 60.

First, a loading cassette 62 into which a magnetic disk 1 that has been processed as far as step ST106 (tape burnishing) is brought into the clean booth 60 from the left side of the clean booth 60, in the direction shown by the arrow I.

Next, the cleaning robot 69 retrieves the magnetic disk 1 from the cassette 62 and places the magnetic disk 1 onto a spindle 64. In FIG. 9, numeral 65 indicates a laser source, numeral 66 indicates a detector, and number 67 indicates a cover that prevents laser light from escaping to the periphery. Laser light emitted by the laser source 65 is irradiated on the magnetic disk 1 as the magnetic disk 1 is rotated by the spindle 64, and the resulting scattered light is detected by the detector 66. By doing so, the presence of foreign matter on the surface of the magnetic disk 1 can be investigated, at least before magnetic transfer is performed.

If the detector 66 finds that foreign matter is present, the magnetic disk 1 is placed into an "NG" cassette (not illustrated) by a cleaning robot 70.

If the detector 66 finds that no foreign matter is present on the surface of the magnetic disk 1, then the cleaning robot 70 places the magnetic disk 1 on the support 6 to carry out the magnetic transfer step 108.

As used in the present embodiment, it is preferable to use a scattered light method to investigate the surface of the magnetic disk 1 in step ST107. This is because investigation using scattered light is suited to the detection of foreign matter on the surface of a disk, and by performing such investigation immediately before the magnetic transfer process, the magnetic transfer process can be restricted to magnetic disks 1 on which foreign matter is not present, making the process more efficient.

Figure 10:
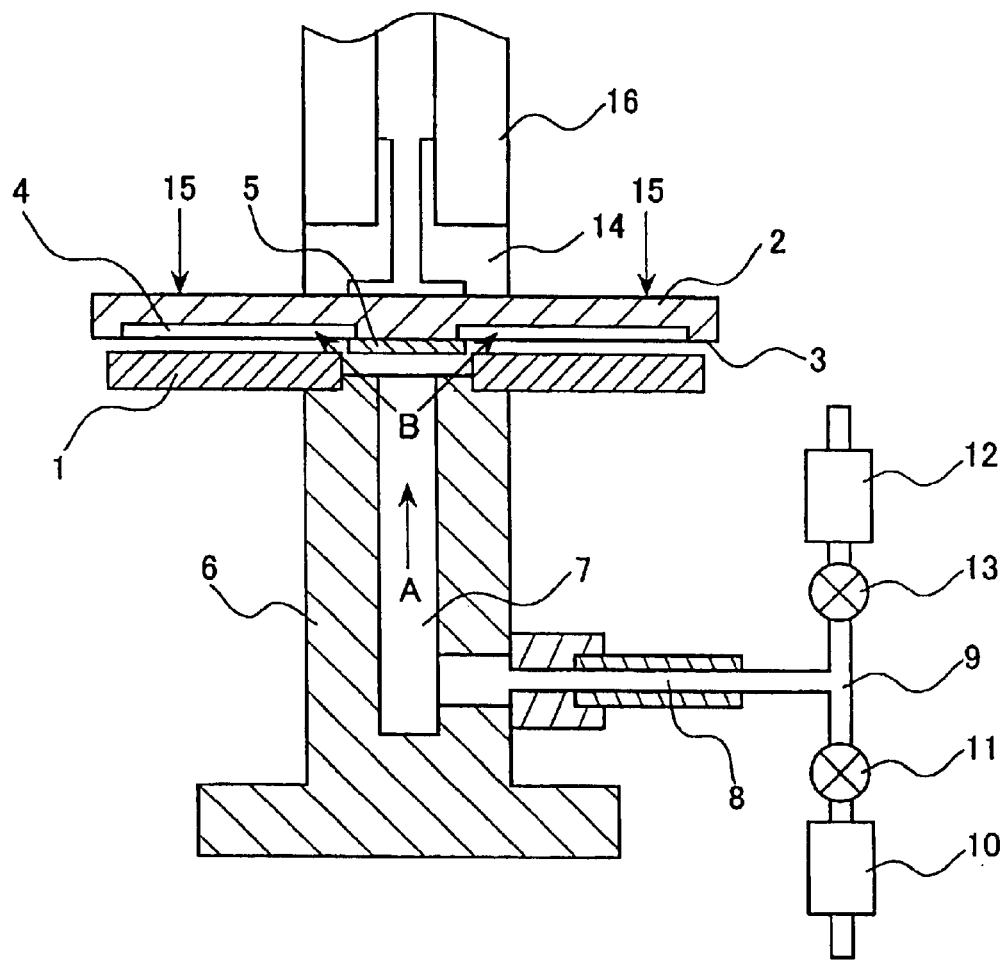
FIG. 10 is a cross-sectional view of an apparatus that performs step ST108 of the present method during a separating operation.
Figure 11:
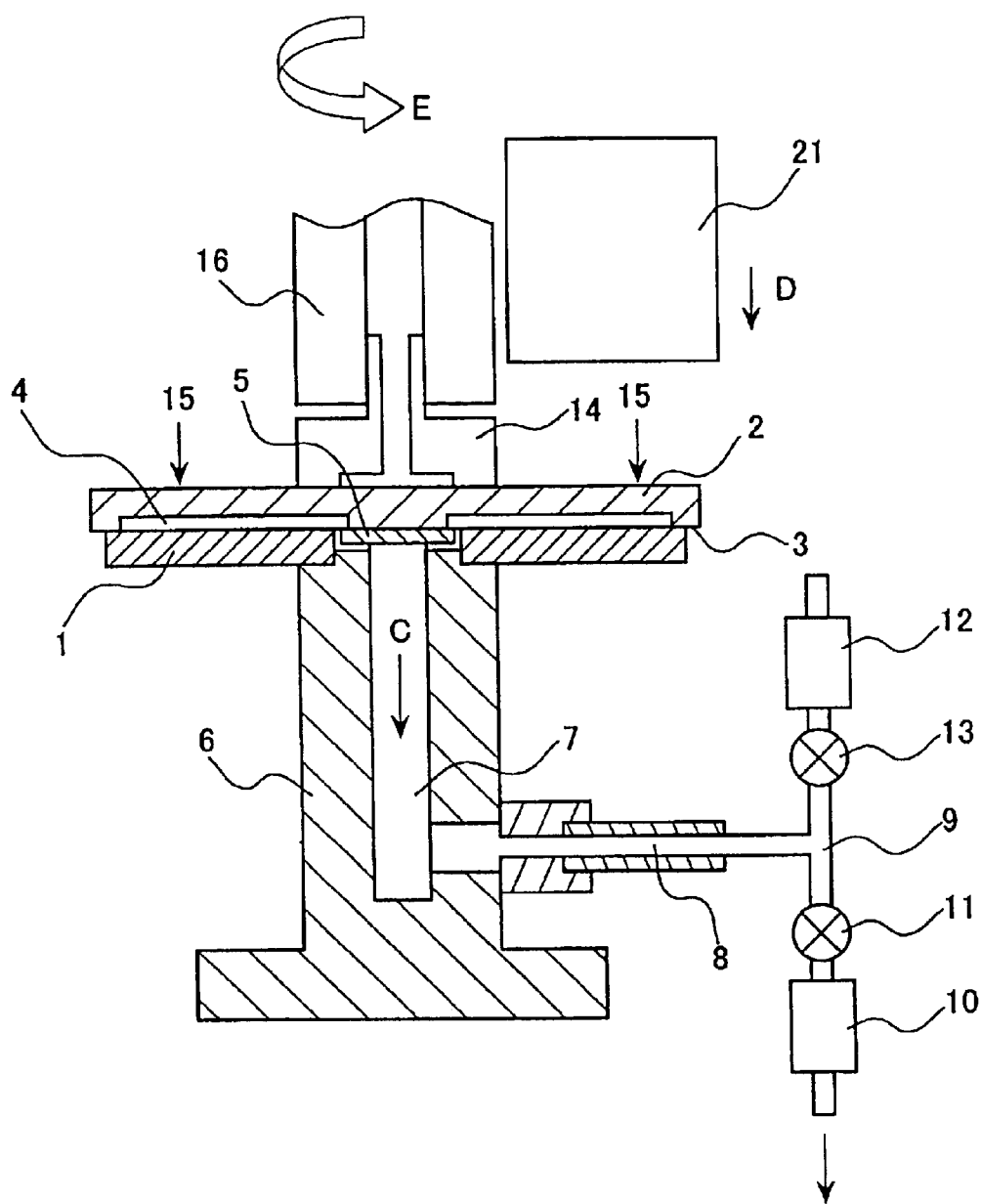
FIG. 11 is a cross-sectional view of the apparatus that performs step ST108 of the present method during a pressing operation.

The magnetic transfer process shown as step ST108 is performed next. This process is described in detail below with reference to FIGS. 10 and 11. FIGS. 10 and 11 are cross-sectional drawings showing the apparatus that performs step ST108 and the operation of this apparatus. FIG. 10 shows the apparatus with the magnetic transfer master 2 and the magnetic disk 1 being separated, while FIG. 11 shows the apparatus with the magnetic transfer master 2 and the magnetic disk 1 being pressed together.

This apparatus has a configuration similar to that of the apparatus used in step ST102 as shown in FIGS. 3 and 4. Accordingly, identical components are referred to using the same reference numerals. The main differences between the apparatuses are that the magnetic disk 1 is mounted on the apparatus in place of the cleaning NiP disk 1A in FIGS. 3 and 4, and, as shown in FIG. 11, this apparatus also includes a magnet 20. The contact surface 3 of the magnetic transfer master 2 that comes into contact with the magnetic disk 1 is as shown in FIG. 5. The magnetic transfer master 2 is held on the holding arm 14 by air that is sucked through a through hole (not illustrated) provided in the holding arm 14.

First, the separating operation is described with reference to FIG. 10. The air supplying pump 12 is operated with the exhaust valve 11 dosed and the air supplying valve 13 open, so that air flows into the air duct 8. As a result, air is pumped through the through hole 7 upward, in the direction shown by the arrow A in FIG. 10. The air that is pumped through the through hole 7 presses the boss 5 upward. The air is also pumped into the grooves 4, as shown by the arrows B. This air that is pumped into the grooves 4 spreads out radially from the center of the magnetic transfer master 2 via the grooves 4. The air then passes through the gap between the magnetic transfer master 2 and the magnetic disk 1 and escapes to the atmosphere. The relationship between the passage of time and the air pressure of the air in the gap (hereafter referred to as "gap S") between the magnetic transfer master 2 and the magnetic disk 1 is shown in FIG. 7.

The pressing is described next with reference to FIG. 11. During this operation, the air supplying pump 12 is stopped and the air supplying valve 13 is closed. As a result, the magnetic transfer master 2 moves downward due to gravity, and the boss 5 engages the center hole of the magnetic disk 1, thereby mounting the magnetic disk 1. After this, the exhaust valve 11 is opened and the suction pump 10 is operated. As a result, air flows through the through hole 7 downwards, in the direction shown by the arrow C in FIG. 11. The air in the grooves 4 also flows through a gap 51 between the center hole of the magnetic disk 1 and the boss 5, resulting in the air pressure in the grooves 4 that are covered by the magnetic disk 1 falling below atmospheric pressure. Therefore, the magnetic disk 1 is pressed onto the magnetic transfer master 2 mainly by atmospheric pressure 15. In FIG. 7, the period that follows the start of evacuation at zero seconds and during which the air pressure in the gap S is about 30 kPa corresponds to the time when the disks are pressed together.

After this, the magnet 20 is moved in the direction shown by the arrow D and so approaches the magnetic transfer master 2. This movement in the direction D is stopped when the magnet 20 is 1 mm from the magnetic transfer master 2. Next the magnet 20 is moved at least once around the circumference of the magnetic disk 1, which is to say in the direction shown by the arrow E, thereby applying the magnetic field required for transfer. By using this method, the pattern formed in the magnetic film 30 formed on the surface of the magnetic transfer master 2 is formed on the surface of the magnetic disk 1.

Once the magnetic transfer of step ST108 has been completed, a clean robot 71 loads the magnetic disk 1 into a discharge cassette 63, before the discharge cassette 63 is discharged from the clean booth 60, as shown in FIG. 9.

In the present embodiment, the investigation in step ST107 and the magnetic transfer in step ST108 are performed together in the clean booth 60. Since the magnetic transfer in step ST108 is performed immediately after the investigation of the surface of the magnetic disk 1 in step ST107, no foreign matter gathers on the surface of the magnetic disk 1 between the two steps. This stops depressions from forming in the surface of the magnetic disk 1 during the magnetic transfer process.

It should be noted that in the present embodiment, the magnetic disk 1 is transported in steps ST107 and ST108 with its recording surface facing upward, although as one example it is also possible to set the surface of the magnetic disk in a vertical orientation where it is parallel to the flow of air from the filter 61 in the clean booth 60 (vertical flow in FIG. 9). In this case, the flow of foreign matter conveyed by the air flow becomes parallel to the surface of the magnetic disk, so that it becomes more difficult for foreign matter to gather on the surface of the magnetic disk.

Also, in the present embodiment, the spindle 64 and the support 6 are arranged separately, although a configuration that allows steps ST107 and ST108 to be performed at the same position may be used.

Figure 12:
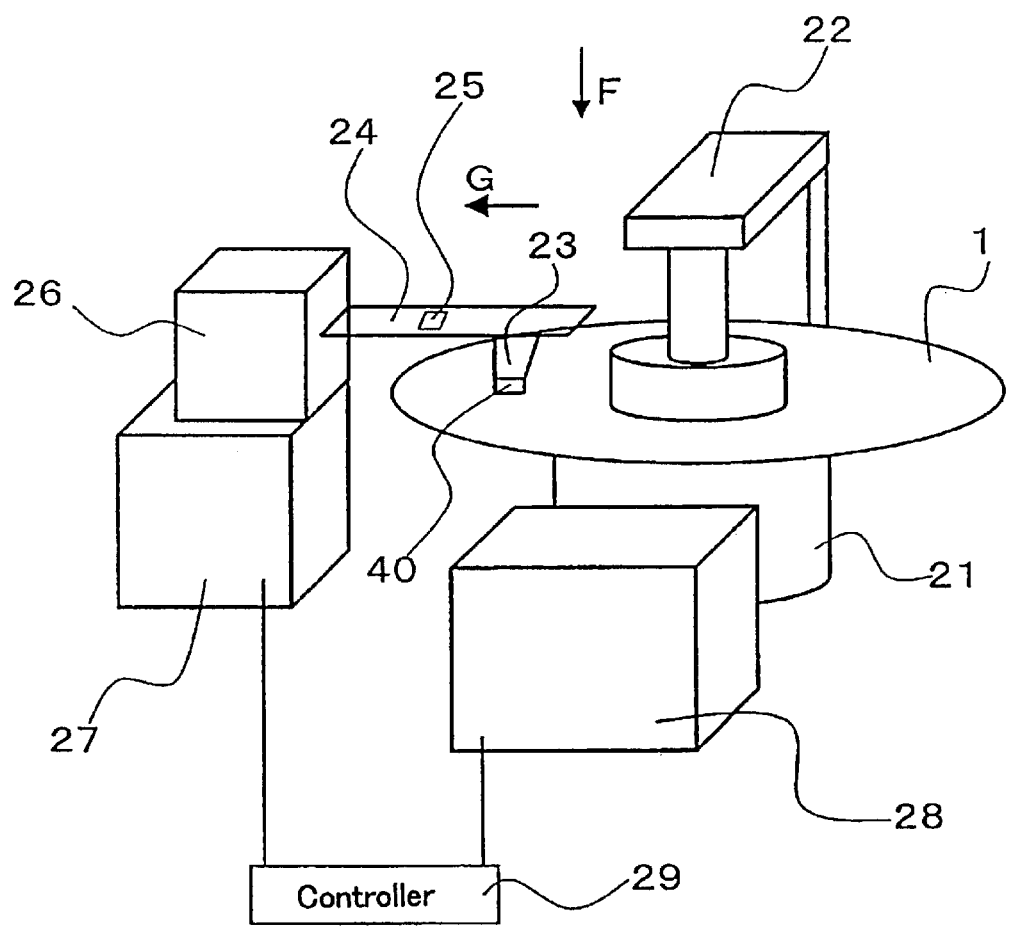
FIG. 12 is a perspective view showing an apparatus for performing a glide height test in the present method.

The following describes the "glide height test" performed as step ST109, with reference to FIG. 12. A glide height test is a test where a detection head scans above the magnetic disk, and defects in the magnetic disk are detected by detecting an impact due to collisions between the detection head and the protrusion on the magnetic disk. When performing this test, the clearance between the detection head and the magnetic disk is set slightly smaller than the clearance used when a magnetic head scans the magnetic disk.

FIG. 12 is a perspective drawing showing an apparatus for performing the glide height test in the present embodiment of the present invention. This apparatus includes a spindle 21 for supporting and rotating the magnetic disk 1 that has been subjected to magnetic transfer in step ST108. The magnetic disk 1 is attached to the spindle 21 by a clamp mechanism 22. A glide height test head slider 40 is supported by a head supporting mechanism 23. This head supporting mechanism 23 is supported at its base by a guide arm 24 in the form of a cantilever. An acoustic emission sensor 25 is attached to this guide arm 24. A head positioning unit 26 acts on the head supporting mechanism 23 and the guide arm 24 to move and position the head 40 above the recording surface of the magnetic disk 1. The operation of the head positioning unit 26 is controlled by a positioning control unit 27. The operation of the spindle 21 is control by a spindle control unit 28. The positioning control unit 27 and spindle control unit 28 are controlled by a controller 29.

The following describes the operation of the above apparatus. First, the controller 29 lets the spindle control unit 28 rotate the magnetic disk 1 at a predetermined speed. Next, the positioning control unit 27 lets the head positioning unit 26 move in the direction shown by the arrow F in FIG. 12 and stop when there is a predetermined distance, for example, 15 nm, between the head 40 and the magnetic disk 1. This position is set according to the following method.

When the head positioning unit 26 has been moved to a certain position, the distance between the magnetic disk 1 and the head 40 is measured. The distance by which the head positioning unit 26 needs to move until the distance between the head 40 and the magnetic disk 1 is 15 nm is then calculated and stored by the controller 29. The controller 29 lets the positioning control unit 27 move the head positioning unit 26 and so sets the distance between the head 40 and the magnetic disk 1 at 15 nm. The distance left between the head 40 and the magnetic disk 1, which is to say 15 nm, is set as described above at a value that is equal to or lower than the distance a magnetic head, provided in a recording/reproducing apparatus into which the magnetic disk 1 has been loaded, floats above the magnetic disk 1 during recording and reproduction.

Next, while the magnetic disk 1 is being rotated, the head 40 is controlled by the positioning control unit 27 so as to move in the direction G shown in FIG. 12, which is to say in the radial direction of the magnetic disk 1, to perform a glide height test for the surface of the magnetic disk 1 that came into contact with the magnetic transfer master 2 during the magnetic transfer in step ST108.

The presence of unwanted protrusions on the surface of the magnetic disk 1, and in particular protrusions that are at least as high as the clearance between the magnetic disk 1 and a magnetic head during recording and reproduction, are detected by the acoustic emission sensor 25, based on excessive vibrational energy produced due to collisions.

Here, when one or more unwanted protrusions are found on a magnetic disk 1, the disk is judged to be defective, and the procedure returns, as shown in FIG. 1, to step ST102 where the cleaning of the magnetic transfer master 2 begins.

When no unwanted protrusions are detected, the disk is judged to be normal, and the following step, step ST110, is performed. In step ST110, the presence of defects on the surface of the magnetic disk 1, and in particular on the surface of the magnetic disk 1 that came into contact with the magnetic transfer master 2 during the magnetic transfer in step ST108, is investigated. The same method as step ST107 in FIG. 1 is used, so that the defects in the surfaces of the magnetic disk 1 are detected optically.

When defects are found by this step, the procedure returns to step ST102 where the cleaning of the magnetic transfer master 2 begins, as shown in FIG. 1. When no defects are found, the magnetic disk 1 is installed in a hard disk apparatus.

By performing the above steps, highly reliable magnetic transfer can be performed. No defects are left on the magnetic disk after magnetic transfer and signal deterioration is avoided.

This is described below with reference to FIG. 13. The table of FIG. 13 shows the results of measurements in which the number of defects on magnetic disks were measured using a commercial optical detection method and the results of an investigation into signal errors as well, with respect to magnetic disks produced according to a variety of magnetic transfer methods, including the magnetic transfer method of the present invention.

Sample methods 1 to 8 are shown on different rows, with the processes included in each method being shown in order from left to right.

The number of defects given as part of the evaluation results shows an average of the number of defects calculated as a relative value where the number of defects on a standard disk that has not been subjected to magnetic transfer is set as one.

Signal errors are shown in the D.O. column in the evaluation results. The signals recorded by magnetic transfer were reproduced and evaluated, a comparison was made with the signal output achieved when reading or writing a standard magnetic disk that has not been subjected to magnetic transfer, and a relative evaluation was made based on the number of defects where dropouts occurred. The results of the evaluation were expressed as ranks "A", "B" and "C". The rank A means that dropouts were similar to those in the signal output achieved when reading or writing a standard magnetic disk that has not been subjected to magnetic transfer. The rank B means that dropouts were 1.5 times those in the signal output achieved from the standard magnetic disk. The rank C means that dropouts were above 1.5 times those in the signal output achieved from the standard magnetic disk. None of the sample method was ranked C.

In the experiments for evaluating the disks, magnetic transfer was performed in accordance with FIGS. 10 and 11 of the present embodiment. For sample methods 6, 7, and 8, an optical detection using a scattered light method was performed before the magnetic transfer, and magnetic transfer was performed only for magnetic disks for which no defects were detected. The optical detection apparatus and magnetic transfer apparatus were provided as one device, as shown in FIG. 9 of the present embodiment, with the magnetic transfer being performed immediately after the optical detection. In the optical detection, foreign matter was detected on the surfaces of 5% of the disks processed using sample method 6, 0% of the disks processed using sample method 7, and 0% of the disks processed using sample method 8.

The experiments were performed with the magnetic transfer master 2 having been subjected to step ST101 (washing the magnetic transfer master disk) and step ST102 (pressing and separating of the magnetic transfer master disk and a cleaning disk), so that no fine particles of foreign matter or unwanted protrusions were present on the contact surface 3.

As can be clearly seen from the results for sample method 6, sample method 7, and sample method 8 in FIG. 13, performing an optical detection on magnetic disks immediately before magnetic transfer enables magnetic disks that meet the same standard, in terms of both the number of defects in the disk surface after magnetic transfer and signal errors, as a conventional disk on which magnetic transfer has not been performed. It is clear from the results for the other sample methods that when optical detection is not performed on magnetic disks immediately before magnetic transfer, both the number of defects in the magnetic disk surface and signal errors are worse than for a conventional magnetic disk.

These results show that when foreign matter is present on the surface of the magnetic disk immediately before magnetic transfer is performed, magnetic transfer causes depressions to be performed in the surface of the magnetic disk. As shown by sample method 1, sample method 4, and sample method 5, once there are depressions in the magnetic disk, while it is possible to repair the defects in the surface of the magnetic disk to a certain degree by performing tape burnishing, it is difficult to repair the disk sufficiently for signal errors to be significantly prevented. The reason for this is that although the rises in the disk surface near the depressions can be removed by tape burnishing, tape burnishing does not flatten out the depressions, so that spacing occurs during reproduction, resulting in lowered signal output that appears as signal errors.

When, as part of a glide height test, head burnishing, or the like, a head scans across the surface of a magnetic disk before magnetic transfer is performed, it becomes easier for foreign matter to gather on the surface of the magnetic disk. When a head scans across the surface of a magnetic disk, the head is moved to a predetermined position, such as 15 nm from the magnetic disk. At such times, it is impossible to stop the head from coming into physical contact with the magnetic disk while the head is being stabilized at the desired distance from the disk. When collisions occur between the head and the magnetic disk, the resulting abrasion damages the surface of the magnetic disk and fragments of disk end up on the disk surface. This problem is becoming increasingly serious as the floating height is decreased to assist in the achievement of higher recording densities. As a result, it is better not to scan a head above the surface of a magnetic disk before magnetic transfer.

In FIG. 13, sample method 1, sample method 2, sample method 3, and sample method 6 represent methods where a head scans above the surface of a magnetic disk before magnetic transfer, while sample method 4, sample method 5, sample method 7, and sample method 8 represent methods where a head does not scan above the surface of a magnetic disk before magnetic transfer.

As can be seen from the evaluation results in FIG. 13, in sample method 1 a head scans above the surface of a magnetic disk before magnetic transfer, and while the resulting defects are repaired to a certain extent by the tape burnishing performed after the magnetic transfer, this is not sufficient to stop signal errors from occurring. On the other hand, in sample method 6 favorable results are obtained in spite of a head scanning the surface of the magnetic disk before magnetic transfer is performed. This is because defects are detected by the optical detection performed before the magnetic transfer. While the occurrence of defects was 0% for both sample methods 7 and 8, the occurrence of defects for sample method 6 was 5%.

From the above, it can be seen that sample method 7 and sample method 8 of the present embodiment are preferable as methods for conditioning magnetic disks to be subjected to magnetic transfer. In sample method 7, tape burnishing is performed after magnetic transfer, though similar evaluation results were obtained for sample method 8 where this process was omitted. Accordingly, the tape burnishing process performed after the magnetic transfer may be omitted.

With the present embodiment described above, magnetic transfer is performed after sputtering, tape burnishing, application of lubricant, and a second tape burnishing, so that the magnetic transfer can be performed with high reliability.

In the present embodiment, the surface of the magnetic disk is measured using an optical detection method immediately before magnetic transfer is performed, and the magnetic transfer is performed immediately after it has been confirmed that there are no defects in the surface of the magnetic disk. As a result, it is possible to perform highly reliable magnetic transfer that does not create depressions in the surface of the magnetic disk.

In the present embodiment, head scanning processes such as head burnishing or a glide height test are not performed before the magnetic transfer, so that it is possible to perform highly reliable magnetic transfer that does not create depressions in the surface of the magnetic disk.

It should be noted that the joint optical detection in step ST107 and magnetic transfer in step ST108 is not limited to arranging the equipment for performing these processes in the same clean booth, as described above in the present embodiment. As examples, the same effect can be achieved if two clean booths are connected to combine the processes, or if the equipment itself is combined into one device provided in a highly dustproof clean booth.

Also, the present embodiment uses a configuration where, as shown in FIG. 9, the surface of the magnetic disk is arranged horizontally, although the disk surface may be held vertically so as to make it more difficult for foreign matter to gather on the disk. In this case, when magnetic transfer is performed in step ST108, the configuration that uses gravity, such as that of the present embodiment shown in FIG. 11, is not used as a means for urging the magnetic transfer master 2 toward the magnetic disk 1. Instead, a configuration where the magnetic transfer master 2 is urged toward the magnetic disk 1, for example, with an energizing spring provided between the holding arm 14 and the holding mount 16 may be used. In this way, the same effects can be achieved.

Second Embodiment

The following describes, with reference to FIGS. 14 through 17, a magnetic transfer apparatus and a method for a magnetic transfer according to the second embodiment of the present invention.

Figure 14:
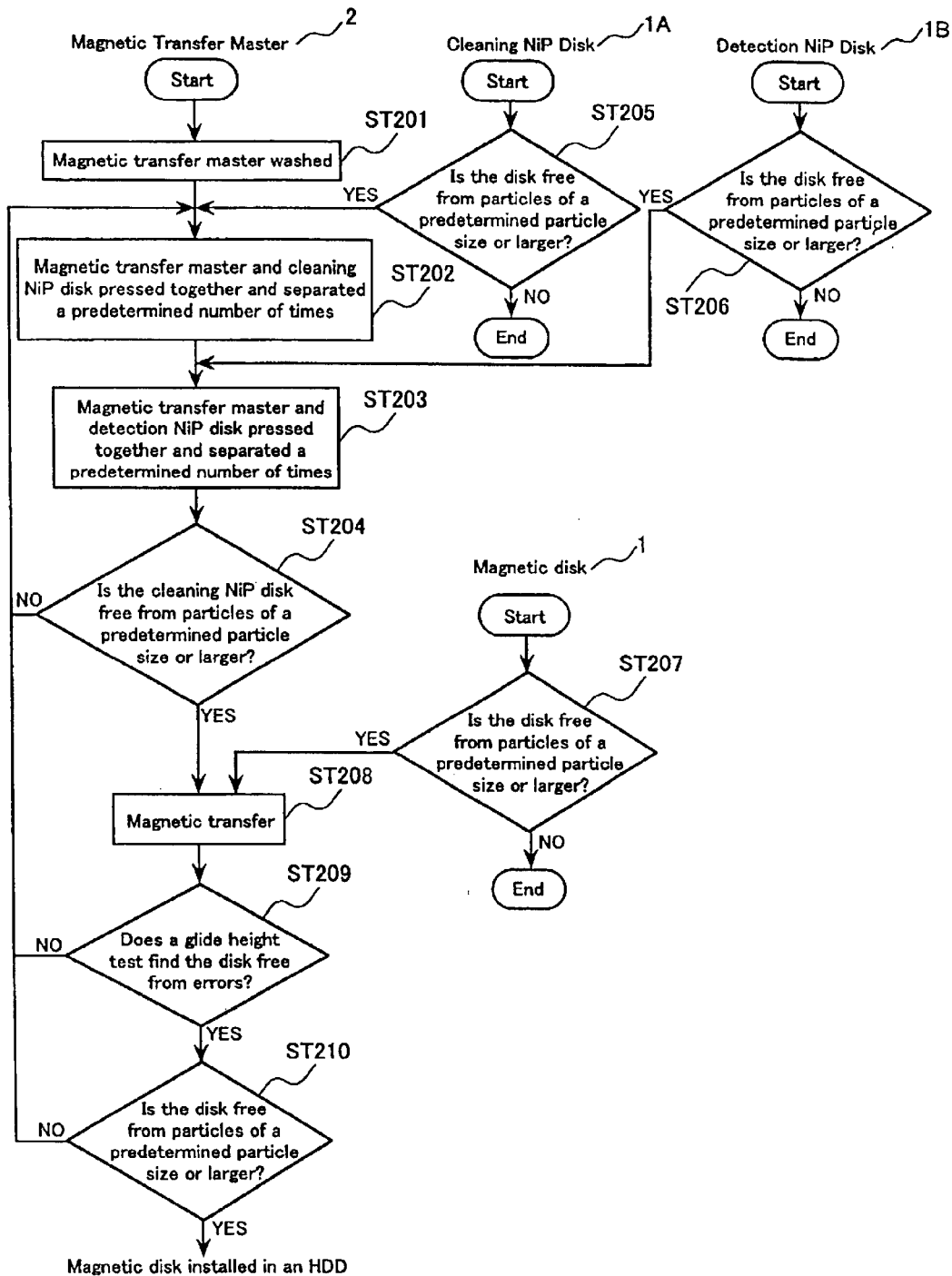
FIG. 14 is a flowchart showing the processes used in a second embodiment of the present invention.

FIG. 14 shows the flow of the procedure that performs magnetic transfer in the present embodiment. The magnetic transfer master used here has the same configuration as the magnetic transfer master 2 of the first embodiment that is shown in FIGS. 2 and 5. As shown in step ST201 in FIG. 14, the magnetic transfer master 2 is first washed using a conventional method, such as scrubbing. However, when an existing washing method is used, it has been found that it is not possible to remove minute particles, whose sizes range from about 20 to 50 nm, of foreign matter that remains on the contact surface 3 of the magnetic transfer master 2. For this reason, step ST202 is performed to remove such minute particles of foreign matter completely. Step ST202 is similar to step ST102 that was described in the first embodiment. Step ST202 is described below with reference to FIGS. 15 and 16.

Figure 15:
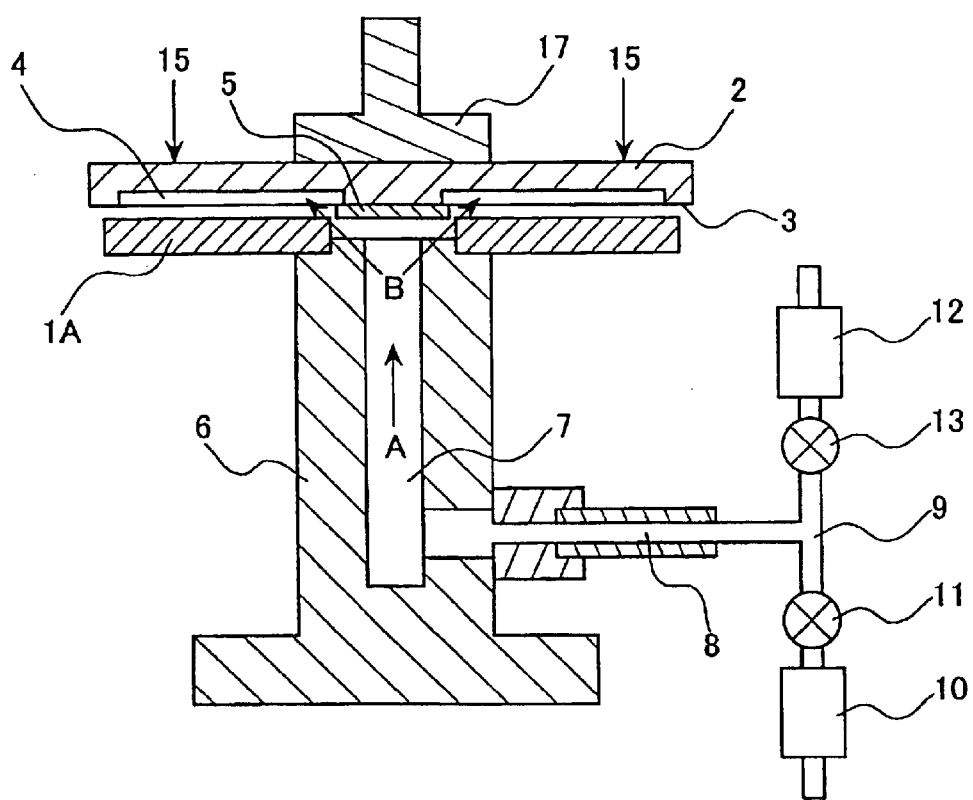
FIG. 15 is a cross-sectional drawing showing an apparatus used in step ST202 of the present method during a separating operation.
Figure 16:
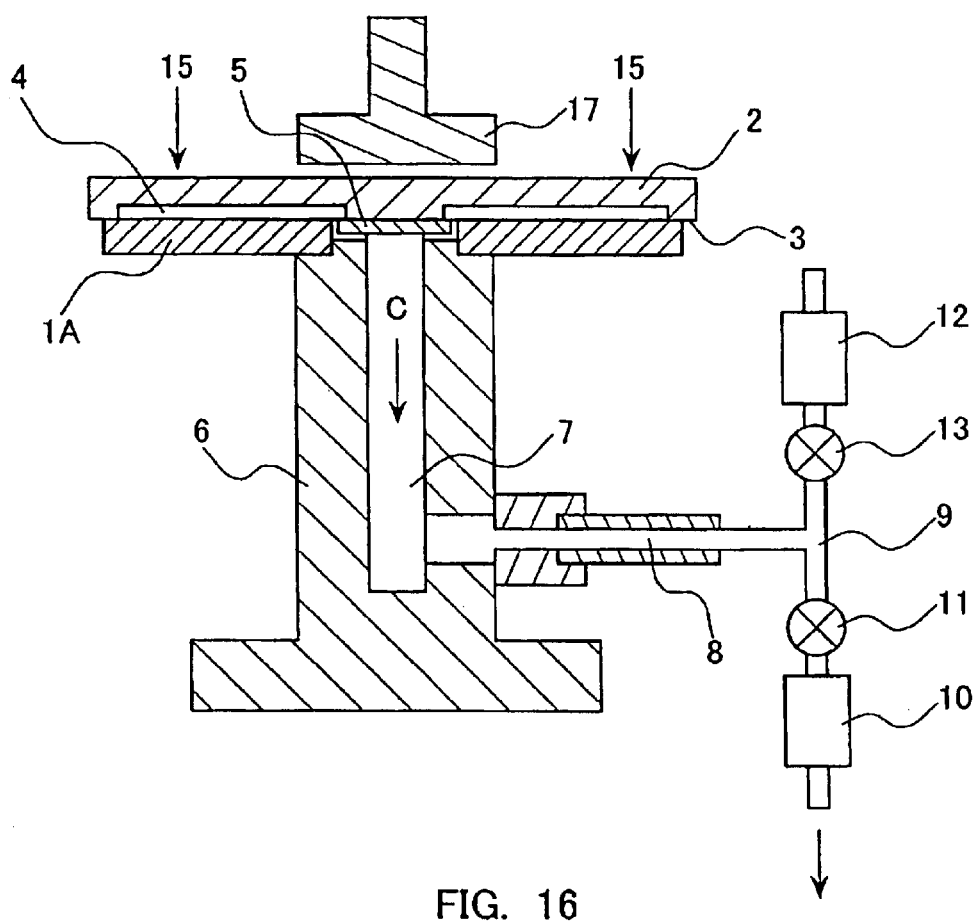
FIG. 16 shows the apparatus of FIG. 15 during a pressing operation.

FIGS. 15 and 16 are cross-sectional drawings showing the apparatus that performs step ST202 and the operation of this apparatus. FIG. 15 shows the apparatus during the separation operation, while FIG. 16 shows the apparatus during the pressing operation. With the exception of a holding arm 17, the configuration and operation of this apparatus are the same as that for the apparatus used in the first embodiment that is shown in FIGS. 3 and 4. Accordingly, components that are the same as the apparatus described earlier have been given the same reference numerals and are not described in detail. The holding arm 17 has an internal through hole (not illustrated) through which air is drawn so as to attach the magnetic transfer master 2 onto the holding arm 17 through suction. In this way, the holding arm 17 holds the magnetic transfer master 2.

First, the separation operation shown in FIG. 15 is performed. This operation is very similar to the operation that was described earlier with reference to FIG. 3. The magnetic transfer master 2 is held by the holding arm 17. The air supplying pump 12 is operated with the exhaust valve 11 closed and the air supplying valve 13 open, so that air flows through the air duct 8 and the through hole 7 and is pumped into the grooves 4. This air that is pumped into the grooves 4 spreads out radially from the center of the magnetic transfer master 2, passes through the gap between the magnetic transfer master 2 and the cleaning NiP disk 1A, and escapes to the atmosphere. This flow of air carries any minute particles of foreign matter that adhere to the surface of the magnetic transfer master 2 or the cleaning NiP disk 1A, exhausting them into the atmosphere together with the air.

The relationship between the passage of time and the air pressure of the air in the gap S between the magnetic transfer master 2 and the cleaning NiP disk 1A is as shown in FIG. 7.

Then, the separation operation shown in FIG. 16 is performed. This operation is very similar to the operation that was described earlier with reference to FIG. 4. During this separation operation, the air supplying pump 12 is stopped and the air supplying valve 13 is closed. As a result, since the suction that held the magnetic transfer master 2 onto the holding arm 17 is removed, the magnetic transfer master 2 is separated from the holding arm 17. The magnetic transfer master 2 falls due to gravity, so that the boss 5 engages the center hole of the cleaning NiP disk 1A, thereby mounting the cleaning NiP disk 1A.

After this, the exhaust valve 11 is opened and the suction pump 10 is operated. The air in the grooves 4 flows through the gap between the center hole of the cleaning NiP disk 1A and the boss 5 and out via the through hole 7, so that the cleaning NiP disk 1A is pressed onto the magnetic transfer master 2 mainly by atmospheric pressure 15. As a result, foreign matter present on the magnetic transfer master 2 is sandwiched between the cleaning NiP disk 1A and the magnetic transfer master 2. Since the cleaning NiP disk 1A is manufactured using a softer material than the magnetic transfer master 2, foreign matter that is sandwiched between the two disks sinks into the cleaning NiP disk 1A or causes depressions in the cleaning NiP disk 1A, without damaging the magnetic transfer master 2. Unintended minute protrusions in the magnetic transfer master 2 are also flattened when the magnetic transfer master 2 is pressed against the cleaning NiP disk 1A.

Next, the separation operation shown in FIG. 15 is performed again. That is to say, the exhaust valve 11 is closed, the air supplying valve 13 is opened, and the air supplying pump 12 is operated. This results in air being pumped in the directions shown by the arrows A and B in FIG. 15. The air pumped in this way forces the magnetic transfer master 2 upward until the magnetic transfer master 2 is stopped by abutting against the holding arm 17. At this point, air passes through the grooves 4 as shown by the arrows B, and so is continually pumped radially outwards from the center of the magnetic transfer master 2 to the outer periphery of the disk. As a result, foreign matter that is present on the surface of the magnetic transfer master 2 is expelled to the atmosphere together with the pumped air from the air supplying pump 12, or is transferred onto the cleaning NiP disk 1A. By repeating the pressing and separating operations a predetermined number of times, foreign matter can be removed from the surface of the magnetic transfer master 2.

In step ST202, it is preferable that the cleaning disk is not coated with a lubricant. If, as with a conventional magnetic disk, lubricant is applied, the ability of the cleaning disk to absorb foreign matter is reduced, so that it becomes more difficult for foreign matter to adhere to the cleaning disk. By using a cleaning NiP disk onto which lubricant has not been applied, it can be ensured that foreign matter present on the magnetic transfer master will adhere to the cleaning disk.

As mentioned earlier, it is preferable that the cleaning NiP disk 1A is softer than the magnetic transfer master 2. If the surface hardness of the cleaning NiP disk 1A is higher than that of the magnetic transfer master 2, the following problem occurs. When foreign matter that is harder than the magnetic transfer master 2 but softer than the cleaning NiP disk 1A is present between the cleaning NiP disk 1A and the magnetic transfer master 2, such foreign matter does not sink into the surface of the cleaning NiP disk 1A since it is harder than the surface of the cleaning NiP disk 1A. Instead, the foreign matter sinks into the surface of the magnetic transfer master 2 which is softer than the foreign matter, thereby causing defects in the magnetic transfer master 2. Such defects, once caused in the magnetic transfer master 2, adversely affect all of the subsequent magnetic transfer processes.

The cleaning disk can be made by plating an aluminum substrate with a NiP layer. It is also possible to form a plating layer with magnetic characteristics, such as a layer of Co—Re—P, Co—Ni—P, or Co—Ni—Re—P. When a plating layer with magnetic characteristics is formed, the following effect is achieved. When unwanted protrusions are present in the magnetic film present on the surface of the magnetic transfer master 2, there are cases where the repeating pressing and separating operations peel off some of the magnetic film. However, when there is a plating layer with magnetic characteristics on the surface of the cleaning NiP disk 1A, the pieces of magnetic film that peel off invariably adhere to the cleaning disk.

It is preferable that a region Sa where there is contact between the cleaning NiP disk 1A and the magnetic transfer master 2 is bigger than a region Sb where there is contact between the magnetic disk 1 and the magnetic transfer master 2 and that the region Sa includes all of the region Sb. This is because if the magnetic disk 1 contacts the magnetic transfer master 2 in a position beyond the region Sa where cleaning is performed, there is the risk of foreign matter adhering to the magnetic disk 1.

One method of making the region Sa bigger than the region Sb is to use a disk that is larger than the magnetic disk 1 as the cleaning NiP disk 1A. However, in practice there are cases where the cleaning NiP disk 1A and the magnetic disk 1 are manufactured by the same manufacturing apparatus. In such cases, both disks are the same size, so that the following method is used to make the region Sa larger than the region Sb. The cleaning NiP disk 1A is placed off-center on the support 6 in FIG. 15, and is rotated every time one cycle of the pressing and separating operations is performed. As a result, the position of the cleaning NiP disk 1A relative to the magnetic transfer master 2 progressively changes, so that the suction and pumping are applied to an area wider than region Sb.

Following step ST202 in FIG. 14, an investigation is performed to detect whether any foreign matter is adhering to surface 3 of the magnetic transfer master 2. Here, it is extremely difficult to directly detect foreign matter adhering to the surface 3 of the magnetic transfer master 2. This is because there are minute recesses and protrusions in the height of the surface 3 of the magnetic transfer master 2 due to the presence of the grooves 4 and minute recesses and protrusions in the magnetic film 30, as shown in FIG. 2. If, for example, an optical detection method is used, light is scattered at the edges of such recesses and protrusions, and foreign matter is mistakenly judged to be present at such positions.

With the present embodiment, the presence of foreign matter on the surface 3 of the magnetic transfer master 2 can be simply and reliably investigated using the following method. Instead of performing a direct investigation of the surface of the magnetic transfer master 2, the magnetic transfer master 2 is pressed against a detection NiP disk and the condition of the surface 3 of the magnetic transfer master 2 is detected from the imprint in the surface of the detection NiP disk. This method of investigating the surface 3 of the magnetic transfer master 2 is described in detail below.

First, as shown by step ST203 in FIG. 14, the magnetic transfer master 2 is pressed against and separated from a detection NiP disk 1B once only. This can be performed by a similar apparatus to the apparatus used in ST202 and shown in FIGS. 15 and 16. The difference to step ST202 is that the detection NiP disk 1B is used in place of the cleaning NiP disk 1A. The surface material of the detection NiP disk 1B is softer than the surface of the magnetic transfer master 2. As a result, recesses and protrusions in the surface of the magnetic transfer master 2 are transferred onto the surface of the detection NiP disk 1B.

Next, in step ST204, an optical investigation is performed for the surface of the detection NiP disk 1B that was pressed against the magnetic transfer master 2. This optical investigation can be conducted by using the Doppler effect to measure the profile of the disk, that is, the defects, to see whether there are any defects with a depth that is equal to or greater than a predetermined depth.

The recesses and protrusions in the surface of the magnetic transfer master 2 have been transferred onto the detection NiP disk 1B, whose surface is flush and that does not include grooves like the magnetic transfer master 2. As a result, the scattering of light does not occur during optical measurement, so that the investigation can be performed properly. By performing this investigation, the magnetic transfer master 2 can be investigated indirectly.

When no defects with a depth equal to or greater than the predetermined depth are found in the investigation in step ST204, it is judged that no foreign matter is present on the magnetic transfer master 2. Using this method, a reliable judgment as to whether foreign matter is present on the magnetic transfer master 2 can be made using a simple procedure.

When no defects with a depth equal to or greater than the predetermined depth are found in the investigation in step ST204, the magnetic transfer master 2 that was used in step ST203 is used for the magnetic transfer performed in step ST208.

When the magnetic transfer master 2 is found to be defective in the investigation in step ST204, the magnetic transfer master 2 is subjected to cleaning again in step ST202.

As shown by steps ST205 and ST206, the cleaning NiP disk 1A and detection NiP disk 1B are optically investigated before being used in the cleaning and investigation of the magnetic transfer master 2. Here, a scattered light method is preferably used as the method for optically investigating the disks. This is because when a scattered light method is used, it is especially easy to detect foreign matter on the surface of a disk. The following describes, with reference to FIG. 17, why it is preferable to perform an optical investigation of the disk before cleaning.

Figure 17:
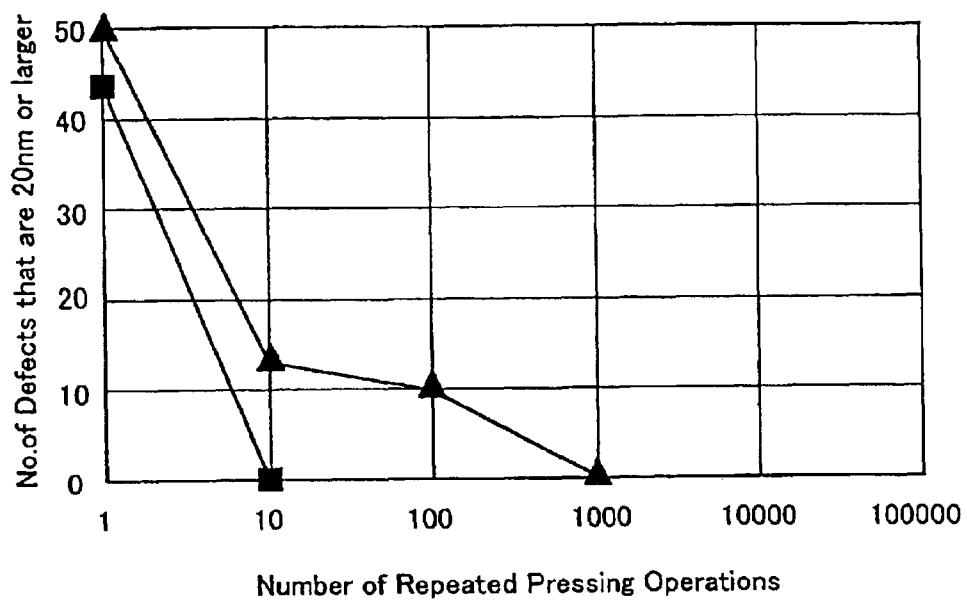
FIG. 17 shows a relationship between a number of times a magnetic transfer master and a cleaning NiP disk were pressed together and separated and a number of defects in the surface of the cleaning NiP disk.
Figure 18:
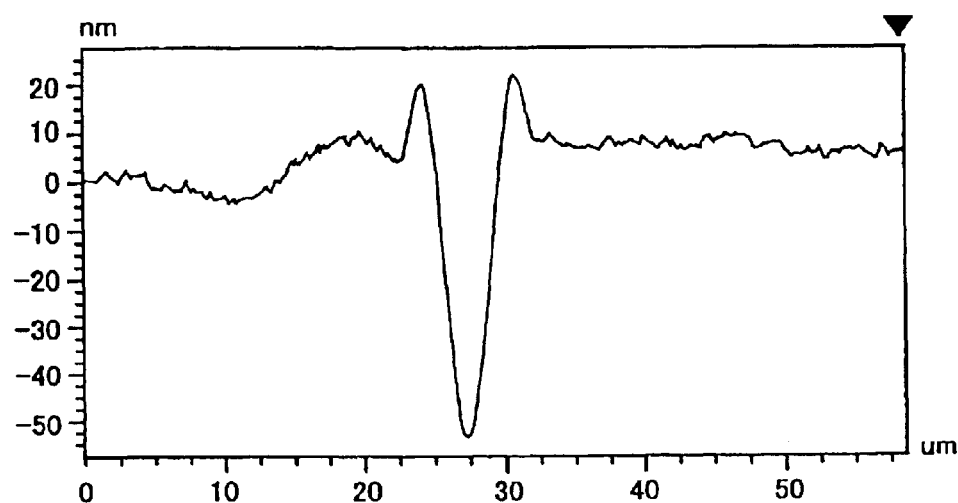
FIG. 18 is a cross-sectional view of a depression in a magnetic disk after magnetic transfer according to a conventional method.
Figure 19:
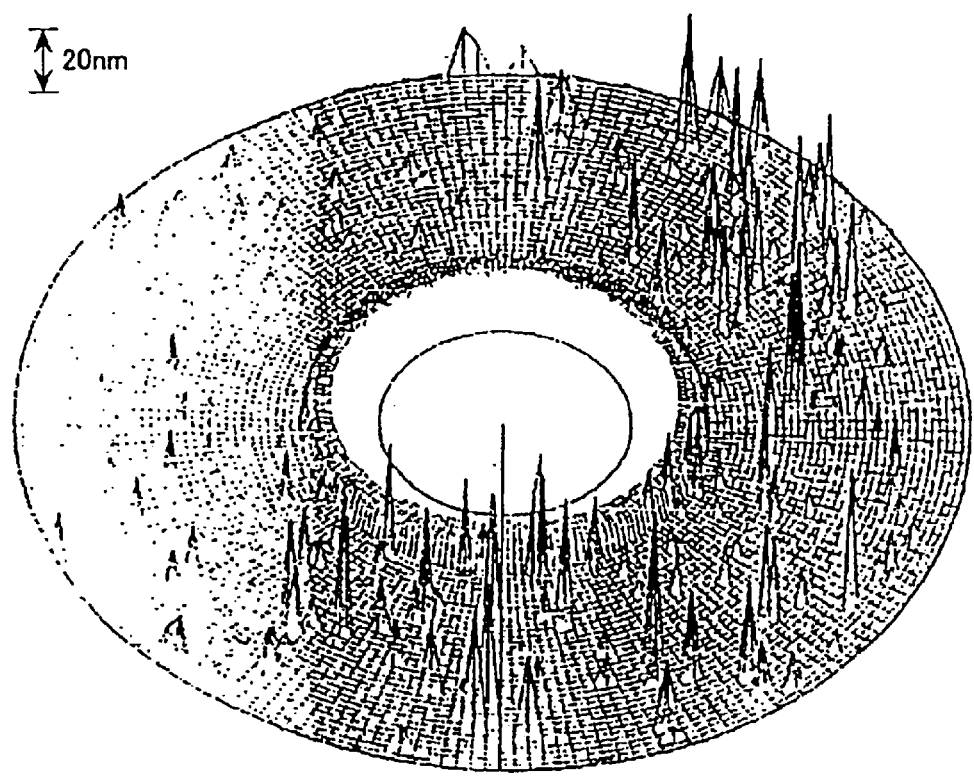
FIG. 19 shows measurements produced by optically measuring the surface of the magnetic disk after the conventional magnetic transfer.

FIG. 17 is a graph showing the following data. First, an optical investigation was performed for a number of cleaning NiP disks 1A and the disks were classified into disks on whose surfaces foreign matter was found and disks on whose surfaces no foreign matter was found. Next, each cleaning NiP disk 1A was repeatedly pressed against and separated from a magnetic transfer master 2, with the number of defects in the surface of the cleaning NiP disk 1A being counted after each cycle. The relationship between the number of times the pressing operation was performed and the number of defects in the surface of each cleaning NiP disk 1A is shown in the graph in FIG. 17. In FIG. 17, the black triangles show data for disks that were found to have foreign matter on their surfaces, while the black squares show disks that were found to have no foreign matter on their surfaces.

In the above experiment, after the cleaning NiP disk 1A and the magnetic transfer master 2 were pressed together and separated once, an optical investigation was performed for the surface of the cleaning NiP disk 1A, and the number of defects in the surface was counted. This measurement was made using a disk tester 4218 made by THOT. The number of defects found at this point was taken as an initial value. Since the defects on the magnetic transfer master 2 are transferred onto the cleaning NiP disk 1A at this point, investigating the surface of the cleaning NiP disk 1A makes it possible to ascertain the state of the defects in the magnetic transfer master 2 indirectly.

Next, after the cleaning NiP disk 1A and magnetic transfer master 2 have been pressed together and separated a predetermined number of times, the cleaning NiP disk 1A is replaced with a new cleaning NiP disk 1A After this new cleaning NiP disk 1A and the magnetic transfer master 2 have been pressed together and separated once, an optical investigation is performed for the surface of the new cleaning NiP disk 1A and the number of defects is counted. This number of defects can be regarded as an indirect indication of the number of defects on the magnetic transfer master 2.

From the results shown in FIG. 17, it can be seen that when a cleaning NiP disk 1A with no foreign matter is used, the number of defects on the magnetic transfer master 2 is reduced to zero when pressing and separating is performed ten times. On the other hand, when a cleaning NiP disk with foreign matter is used, pressing and separating need to be performed over one thousand times to reduce the number of defects on the magnetic transfer master 2 to zero.

This is to say, the cleaning process performed for the magnetic transfer master 2 (step ST202 in FIG. 14) can be performed efficiently if an investigation is first performed for cleaning NiP disks and only cleaning NiP disks that do not have foreign matter are used for the cleaning.

The reason an investigation is performed, as shown by step ST206, for the detection NiP disk 1B before the disk is pressed onto the magnetic transfer master 2 is that this prevents, from the start, foreign matter from adhering to the magnetic transfer master 2 due to contact with the detection NiP disk 1B.

The following describes a method for manufacturing and conditioning the magnetic disk 1. First, a magnetic layer is formed on the surface of a substrate using a conventional method. As one example, this magnetic layer can be formed by performing a dry plating method, such as vapor deposition or sputtering, on an aluminum substrate. Conventionally, this magnetic layer is protected by forming a protective layer on top of the magnetic layer using dip coating, spin coating, or a dry plating method, such as vapor deposition or sputtering.

Next, a lubricant layer is formed using a conventional method. This lubricant is applied to the magnetic disk by immersing the magnetic disk 1 disk in a lubricant solution and then pulling out the disk at a predetermined speed. In this way, the magnetic disk 1 is conditioned.

Next, as shown by step ST207, the magnetic disk 1 is subjected to an optical investigation to detect whether foreign matter is present on the surface of the magnetic disk 1. Here, it is preferable to use a scattered light detection method for the investigation, since a scattered light detection method is suited to detecting foreign matter on the surface of a disk. In order to remove definitely any foreign matter immediately before the magnetic transfer that follows this investigation, this method preferably should be used. Naturally, it is also possible to take an existing magnetic disk 1 and subject it to the optical investigation in step ST207. When no particles with a particle size that is equal to or greater than a predetermined size are present on the surface of a magnetic disk 1, the magnetic disk 1 is supplied to step ST208 where magnetic transfer is performed.

The following describes step ST208 in which magnetic transfer is performed. The apparatus for performing this process is similar to the apparatus that was used in the first embodiment and is shown in FIGS. 10 and 11, so that this apparatus is described below with reference to FIGS. 10 and 11.

In the magnetic transfer of step ST208, the separating operation for separating the magnetic disk 1 and the magnetic transfer master 2 is as shown in FIG. 10. The relationship between the passage of time and the air pressure of the air in the gap S between the magnetic transfer master 2 and the magnetic disk 1 during this operation is as shown in FIG. 7.

The pressing operation is achieved using suction and is performed as shown in FIG. 11. During this operation, the air supplying pump 12 is stopped and the air supplying valve 13 is closed. As a result, the holding arm 14 to which the magnetic transfer master 2 is attached moves downward due to its own weight, and the boss 5 engages the center hole of the magnetic disk 1, thereby mounting the magnetic disk 1. After this, the exhaust valve 11 is opened and the suction pump 10 is operated. As a result, air flows through the through hole 7 downwards, which is to say, in the direction shown by the arrow C in FIG. 11. The air in the grooves 4, which is to say the air in the gap S, also flows through a gap between the center hole of the magnetic disk 1 and the boss 5.

As a result, the entire surfaces of the magnetic disk 1 and the magnetic transfer master 2 are pressed together, and the pressure becomes lower than atmospheric pressure, so that the magnetic disk 1 is pressed onto the magnetic transfer master 2 by the atmospheric pressure 15.

Next, as shown in FIG. 11, the magnet 20 is moved in the direction shown by the arrow D and so approaches the magnetic transfer master 2. When the magnet 20 is 1 mm from the magnetic transfer master 2, the movement in the direction D is stopped. Next, the magnet 20 is moved at least once around the circumference of the magnetic disk 1, in the direction shown by the arrow E, thereby applying the magnetic field required for transfer.

After this, the separation process shown in FIG. 10 is repeated to separate the magnetic transfer master 2 and the magnetic disk 1 from another.

Next, a glide height test is performed as step ST209. This process is similar to the glide height test performed in step ST109 in the first embodiment, and is performed using the apparatus shown in FIG. 12.

In step ST209, when one or more unwanted protrusions are found on a magnetic disk 1, the disk is judged to be defective, and the procedure returns to step ST202 in FIG. 14, where the cleaning of the magnetic transfer master 2 begins. When no unwanted protrusions are detected, the disk is judged to be normal, and the following step ST210, is performed.

In step ST210, the presence of defects on the surface of the magnetic disk 1 is investigated using an optical detection method. When defects are found by this step, the procedure returns to step ST202 where the cleaning of the magnetic transfer master 2 begins, as shown in FIG. 14. When no defects are found, the magnetic disk 1 is installed in a hard disk apparatus.

As described above, while magnetic transfer is being repeatedly performed, it is judged whether foreign matter is adhering to the magnetic transfer master 2 using the following method. An investigation is performed to detect defects in the surface of the magnetic disk 1 after the magnetic disk 1 has been subjected to magnetic transfer, the magnetic transfer master 2 is cleaned when defects are found, and then another investigation is performed. By doing so, the foreign matter on the magnetic transfer master 2 can be quickly and easily detected, and removed. This makes highly reliable magnetic transfer possible.

With the present embodiment, a disk whose surface has been subjected to optical detection to confirm that it does not have foreign matter is pressed against and separated from a magnetic transfer master disk to clean the magnetic transfer master disk. In this way the magnetic transfer master disk can be completely cleaned in an efficient manner.

Also with the present embodiment, the judgment as to whether foreign matter has been removed from the surface of the magnetic transfer master disk is made for the magnetic transfer master disk after the pressing operation. This simplifies the extent to which the master disk is washed, and makes a correct judgment possible.

It should be noted that while the magnetic transfer master 2 is subjected to step ST202 after washing in the present embodiment, the magnetic transfer master 2 still can be cleaned sufficiently if step ST201 is omitted and the processing instead starts from step ST202.

Also, the same apparatus may be used for steps ST202 and ST208.

The magnetic disk 1 and the magnetic transfer master 2 do not need to be aligned using the boss 5, as described above. A movable stage may be provided on the holding arm 14 that holds the magnetic transfer master 2 and an optical method may be used to align the magnetic disk 1 and the magnetic transfer master 2.

INDUSTRIAL APPLICABILITY

The present invention achieves a highly reliable magnetic transfer method that does not create minute protrusions on a magnetic disk when transferring a magnetic pattern corresponding to an information signal onto the magnetic disk using a magnetic transfer master disk. The invention also achieves a magnetic transfer method where a magnetic transfer master disk is efficiently and reliably cleaned, making the conditioning process highly efficient.

What is claimed is:

1. A method of manufacturing a master-information-recorded magnetic disk comprising bringing a magnetic disk into close contact with a magnetic transfer master having a magnetic film formed on at least one side, and transferring magnetically a pattern of the magnetic film on the magnetic transfer master onto the magnetic disk through application of an external magnetic field, the method including a defect detecting step for detecting defects in a disk, wherein after the defect detecting step has confirmed that one of a number of defects on the surface of a cleaning disk and a size of the defects on the surface of the cleaning disk is not greater than a predetermined value, the cleaning disk is brought into close contact and separated from the magnetic transfer master a predetermined number of times, before the magnetic transfer master is brought into close contact with the magnetic disk and magnetic transfer is performed.

2. A method of manufacturing a master-information-recorded magnetic disk comprising bringing a magnetic disk into close contact with a magnetic transfer master having a magnetic film formed on at least one side, and transferring magnetically a pattern of the magnetic film on the magnetic transfer master onto the magnetic disk through application of an external magnetic field, the method including a defect detecting step for detecting defects in a disk, wherein after a cleaning disk has been brought into close contact and separated from the magnetic transfer master a predetermined number of times, the magnetic transfer master is brought into close contact with a detection disk, the detection disk having been subjected to the defect detecting step to confirm, for a surface of the detection disk that comes into contact with the magnetic transfer master, that one of a number of defects and a size of the defects is not greater than a predetermined value, and the detection disk is then subjected to the defect detecting step and when the defect detecting step confirms that that one of a number of defects on a surface and a size of the defects is not greater than a predetermined value, the magnetic disk and the magnetic transfer master are brought into close contact and magnetic transfer is performed.

3. A method of manufacturing a master-information-recorded magnetic disk comprising bringing a magnetic disk into close contact with a magnetic transfer master having a magnetic film formed on at least one side, and transferring magnetically a pattern of the magnetic film on the magnetic transfer master onto the magnetic disk through application of an external magnetic field, the method including a defect detecting step for detecting defects in a disk, wherein the magnetic transfer master is brought into close contact and separated from a cleaning disk a predetermined number of times, the cleaning disk having been subjected to the defect detecting step to confirm, for a surface of the cleaning disk that comes into contact with the magnetic transfer master, that one of a number of defects and a size of the defects is not greater than a predetermined value, the magnetic transfer master is then brought into close contact with a detection disk, the detection disk having been subjected to the defect detecting step to confirm, for a surface of the detection disk that comes into contact with the magnetic transfer master, that one of a number of defects and a size of the defects is not greater than a predetermined value, and the detection disk is then subjected to the defect detecting step and when the defect detecting step confirms that that one of a number of defects on a surface and a size of the defects is not greater than a predetermined value, the magnetic disk and the magnetic transfer master are brought into close contact and magnetic transfer is performed.

4. A method of manufacturing a master-information-recorded magnetic disk comprising bringing a magnetic disk into close contact with a magnetic transfer master having a magnetic film formed on at least one side, and transferring magnetically a pattern of the magnetic film on the magnetic transfer master onto the magnetic disk through application of an external magnetic field, the method including a defect detecting step for detecting defects in a disk, wherein after the pattern of the magnetic film on the magnetic transfer master has been magnetically transferred onto the magnetic disk, the magnetic disk is subjected to the defect detecting step, and when one of the number of defects and size of defects is equal or greater than a predetermined value, the magnetic transfer master is brought into close contact with and separated from a cleaning disk a predetermined number of times.

5. The method of manufacturing a master-information-recorded magnetic disk according to any of claims 1, to 4, wherein the magnetic transfer master and cleaning disk are brought into close contact by evacuating a gas between the magnetic transfer master and cleaning disk and the magnetic transfer master and cleaning disk are separated by introducing a gas between the magnetic transfer master and cleaning disk.

6. The method of manufacturing a master-information-recorded magnetic disk according to any of claims 1, to 4, wherein the magnetic transfer master is harder than the magnetic disk and the cleaning disk.

7. The method of manufacturing a master-information-recorded magnetic disk according to any of claims 1, to 4, wherein the cleaning disk is softer than the magnetic disk.

8. The method of manufacturing a master-information-recorded magnetic disk according to any of claims 1, to 4 wherein a region where there is contact between the magnetic transfer master and the cleaning disk includes a region where magnetic transfer is performed from the magnetic transfer master to the magnetic disk.

9. The method of manufacturing a master-information-recorded magnetic disk according to any of claims 1, to 4, wherein in the process that the magnetic transfer master disk is brought into close contact and separated from the cleaning disk, the cleaning disk having no lubricant applied is used so as to remove foreign matter from the magnetic transfer master.

10. The method of manufacturing a master-information-recorded magnetic disk according to any of claims 1, to 4 wherein the cleaning disk has a plating layer on its surface.

11. The method of manufacturing a master-information-recorded magnetic disk according to claim 10, wherein the plating layer has magnetic characteristics.

12. The method of manufacturing a master-information-recorded magnetic disk according to any of claims 1, to 4, wherein the surface of the magnetic disk is subjected to the defect detection process before magnetic transfer is performed, and immediately after confirming that one of a number of defects and a size of defects is not greater than a predetermined value, the magnetic disk is brought into close contact with the magnetic transfer master and magnetic transfer is performed.

13. A magnetic transfer apparatus for magnetically transferring an arrangement pattern corresponding to predetermined information signals composed of a magnetic film formed on a magnetic transfer master onto a magnetic disk as a magnetized pattern of the information signals, comprising:

pressing means for bringing the magnetic transfer master and the magnetic disk into close contact with each other;

separating means for separating the magnetic transfer master and the magnetic disk from each other which have been brought into close contact with each other;

magnetic field applying means for applying an external magnetic field; and defect detecting means for detecting defects on a surface of a disk, wherein after a surface of a cleaning disk is inspected by the defect detecting means and the defect detecting means has confirmed that one of a number of defects on the surface of the magnetic disk and a size of the defects on the surface of the magnetic disk is not greater than a predetermined value, the cleaning disk is brought into close contact and separated from the magnetic transfer master a predetermined number of times, the magnetic transfer master is brought into close contact with the magnetic disk by the pressing means, and the external magnetic field is applied by the magnetic field applying means, so that the pattern corresponding to the information signals is magnetically transferred onto the magnetic disk as a magnetized pattern.

* * * * *